US012786776B2

(12) United States Patent
Li et al.

(10) Patent No.: US 12,786,776 B2
(45) Date of Patent: Nov. 3, 2026

(54) MEASUREMENT REPORT RESOURCE MANAGEMENT IN WIRELESS COMMUNICATIONS

(71) Applicant: QUALCOMM Incorporated, San Diego, CA (US)

(72) Inventors: Qiaoyu Li, Beijing (CN); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/839,909

(22) PCT Filed: Apr. 21, 2022

(86) PCT No.: PCT/CN2022/088105

§ 371 (c)(1),
(2) Date: Aug. 20, 2024

(87) PCT Pub. No.: WO2023/201613

PCT Pub. Date: Oct. 26, 2023

(65) Prior Publication Data

US 2025/0175836 A1 May 29, 2025

(51) Int. Cl.
*H04L 5/00* (2006.01)
*H04W 24/10* (2009.01)

(52) U.S. Cl.
CPC ........... *H04W 24/10* (2013.01); *H04L 5/0057* (2013.01)

(58) Field of Classification Search
CPC ..... H04L 5/003; H04L 5/0053; H04L 5/0057; H04W 24/00; H04W 24/10;
(Continued)

(56) References Cited

U.S. PATENT DOCUMENTS

| | | | |
|---|---|---|---|
| 10,986,644 | B2 | 4/2021 | Luo et al. |
| 2011/0009116 | A1 | 1/2011 | Moberg et al. |
| 2022/0078656 | A1 | 3/2022 | Venugopal et al. |

FOREIGN PATENT DOCUMENTS

| | | | |
|---|---|---|---|
| CN | 108112074 | A | 6/2018 |
| WO | WO-2019074761 | A1 | 4/2019 |

OTHER PUBLICATIONS

International Search Report and Written Opinion—PCT/CN2022/088105—ISA/EPO—Dec. 5, 2022.

(Continued)

*Primary Examiner* — Matthew W Genack
(74) *Attorney, Agent, or Firm* — Holland & Hart LLP/Qualcomm

(57) ABSTRACT

This disclosure provides systems, methods and apparatus, including computer programs encoded on computer storage media, for measurement report resource management in wireless communications. In some aspects, a user equipment (UE) may transmit a first measurement report that includes a request field that indicates whether additional uplink resources for the one or more additional measurement reports are requested. The one or more additional measurement reports may be requested if a predictive estimation at the UE indicates a change reported measurements, such as a change in a ranking of beam measurements. The request field may include one or more bit points that indicate whether additional uplink resources are requested, or a type of resources requested. A network entity may allocate uplink resources for additional measurement reports according to the request field, and the UE may transmit one or more additional measurement reports using the additional uplink resources.

30 Claims, 13 Drawing Sheets

(58) Field of Classification Search
CPC ......... H04W 36/0055; H04W 36/0058; H04W 36/0085; H04W 36/0088; H04W 36/0094; H04W 36/30; H04W 36/302; H04W 36/304; H04W 72/00; H04W 72/04; H04W 72/21; H04W 72/50; H04W 72/51; H04W 72/54; H04W 72/542
See application file for complete search history.

(56) References Cited

OTHER PUBLICATIONS

ZTE: "Discussion on Single Connected Handover", 3GPP TSG-RAN WG2 Meeting #99, R2-1708120, Berlin, Germany, Aug. 21-25, 2017, 5 Pages, The whole document.

MEASUREMENT REPORT RESOURCE MANAGEMENT IN WIRELESS COMMUNICATIONS

CROSS REFERENCE

The present Application is a 371 national phase filing of International PCT Application No. PCT/CN2022/088105 by LI et al., entitled "MEASUREMENT REPORT RESOURCE MANAGEMENT IN WIRELESS COMMUNICATIONS," filed Apr. 21, 2022, which is assigned to the assignee hereof, and which is expressly incorporated by reference in its entirety herein.

TECHNICAL FIELD

This disclosure relates to wireless communications, including measurement report resource management in wireless communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method may include transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set, receiving an indication that a second uplink resource is allocated for the second measurement report, and transmitting the second measurement report via the second uplink resource.

Another innovative aspect of the subject matter described in this disclosure can be implemented in an apparatus for wireless communications at a UE. The apparatus may include an interface configured to output a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set, obtain an indication that a second uplink resource is allocated for the second measurement report, and output the second measurement report via the second uplink resource.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to transmit a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set, receive an indication that a second uplink resource is allocated for the second measurement report, and transmit the second measurement report via the second uplink resource.

Another innovative aspect of the subject matter described in this disclosure can be implemented in another apparatus for wireless communication at a UE. The apparatus may include means for transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set, means for receiving an indication that a second uplink resource is allocated for the second measurement report, and means for transmitting the second measurement report via the second uplink resource.

Another innovative aspect of the subject matter described in this disclosure can be implemented in a non-transitory computer-readable medium storing code for wireless communication at a UE is described. The code may include instructions executable by a processor to transmit a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set, receive an indication that a second uplink resource is allocated for the second measurement report, and transmit the second measurement report via the second uplink resource.

In some implementations of the method, apparatuses, and non-transitory computer-readable medium described herein, the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources is for aperiodic or semi-persistent measurement reporting, or any combinations thereof.

Some implementations of the method, apparatuses, and non-transitory computer-readable medium described herein may further include operations, features, means, or instructions for measuring a first set of reference signals associated with the first channel measurement resource set to obtain one or more measurements for the first measurement report and predicting one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or may be different reference signals than the first set of reference signals.

In some implementations of the method, apparatuses, and non-transitory computer-readable medium described herein, the indication that the one or more additional uplink resources are requested is provided in an uplink resource request field transmitted with the first measurement report, and where and a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

In some implementations of the method, apparatuses, and non-transitory computer-readable medium described herein, the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances.

One innovative aspect of the subject matter described in this disclosure can be implemented in a method for wireless communications at a network entity. The method may include receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, transmitting an indication to the UE that a second uplink resource is allocated for the second measurement report, and receiving the second measurement report via the second uplink resource, where the second measurement report provides one or more of a predicted measurement or an actual measurement associated with the second channel measurement resource set.

Another innovative aspect of the subject matter described in this disclosure can be implemented in an apparatus for wireless communications at a network entity. The apparatus may include an interface configured to obtain, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, output an indication to the UE that a second uplink resource is allocated for the second measurement report, and obtain the second measurement report via the second uplink resource, where the second measurement report provides one or more of a predicted measurement or an actual measurement associated with the second channel measurement resource set.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to receive, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, transmit an indication to the UE that a second uplink resource is allocated for the second measurement report, and receive the second measurement report via the second uplink resource, where the second measurement report provides one or more of a predicted measurement or an actual measurement associated with the second channel measurement resource set.

Another innovative aspect of the subject matter described in this disclosure can be implemented in another apparatus for wireless communications at a network entity. The apparatus may include means for receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, means for transmitting an indication to the UE that a second uplink resource is allocated for the second measurement report, and means for receiving the second measurement report via the second uplink resource, where the second measurement report provides one or more of a predicted measurement or an actual measurement associated with the second channel measurement resource set.

Another innovative aspect of the subject matter described in this disclosure can be implemented in a non-transitory computer-readable medium storing code for wireless communications at a network entity. The code may include instructions executable by a processor to receive, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, transmit an indication to the UE that a second uplink resource is allocated for the second measurement report, and receive the second measurement report via the second uplink resource, where the second measurement report provides one or more of a predicted measurement or an actual measurement associated with the second channel measurement resource set.

In some implementations of the method, apparatuses, and non-transitory computer-readable medium described herein, the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

In some implementations of the method, apparatuses, and non-transitory computer-readable medium described herein, the first measurement report includes measurements of a first set of reference signals associated with the first channel measurement resource set and the second measurement report includes one or more predicted measurement values for one or more future time instances for a second set of reference signals associated with the second channel measurement resource set, where one or more reference signals of the second set of reference signals correspond with one or more reference signals of the first set of reference signals, or may be different reference signals than the first set of reference signals.

In some implementations of the method, apparatuses, and non-transitory computer-readable medium described herein, the indication that the one or more additional uplink resources are requested is provided in an uplink resource request field transmitted with the first measurement report, and where and a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

In some implementations of the method, apparatuses, and non-transitory computer-readable medium described herein, the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances and a second bit value of the one or more remaining bit values indicates that a second measurement resource of the first channel measurement resource set is predicted to have a higher signal strength for one or more future time instances than the signal strength of the first measurement resource of the first channel measurement resource set, and where the first measurement resource has a higher signal strength than the second measurement resource in the first measurement report.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
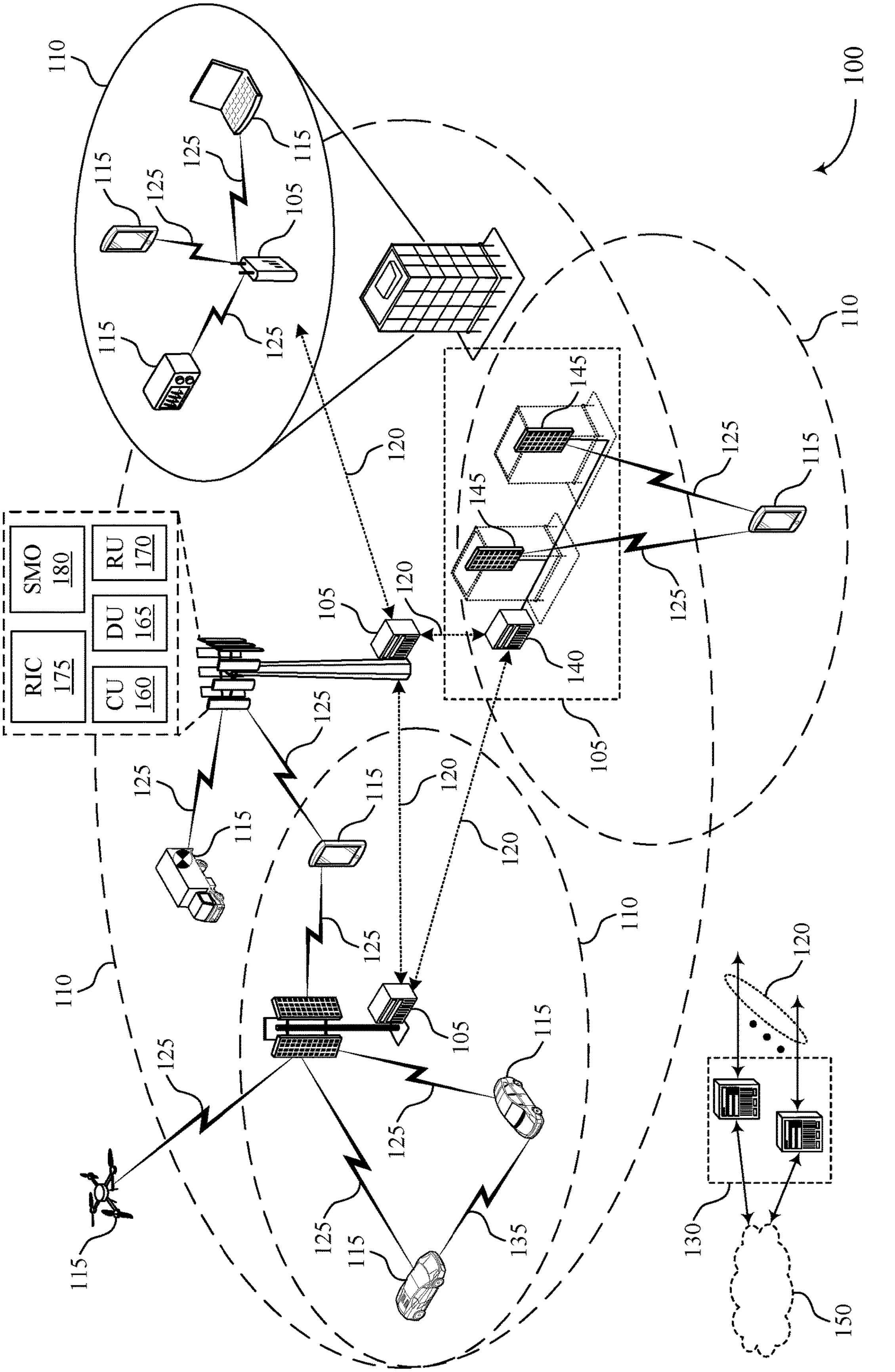
FIG. 1 shows an example of a wireless communications system that supports measurement report resource management in wireless communications.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G) or fifth generation (5G), or further implementations thereof, technology.

In some wireless communications systems, a user equipment (UE) may transmit one or more measurement reports to a network entity. The measurement reports may be used to: manage the selection and management of directional beams for communications between the UE and the network entity, handovers of the UE between serving cells, or power control of transmissions. The measurement reports may include values of one or more actual measurements made at the UE, such as, but not limited to, reference signal received power (RSRP) measurement values or signal to noise ratio (SNR) measurement values for one or more reference signals. In addition to measurement reports corresponding to actual measurements at the UE, the UE may report predictive estimations of the measurements for one or more future time periods. For example, a UE may use a predictive estimation model, such as, but not limited to, an artificial intelligence (AI) or machine learning (ML) model, to estimate channel conditions for one or more future time periods. The predictive estimations may provide for updated measurements and allow a UE or the network entity to anticipate when a beam change from a first beam to a second beam, or a handover between serving cells, may be appropriate or useful.

The UE may transmit one or more supplemental measurement reports, in addition to a measurement report containing actual measurements, that include predictive estimations for one or more measurements. To obtain resources for transmitting the one or more supplemental measurement reports, a regularly scheduled measurement report transmitted by the UE may include a request field that indicates whether the UE requests additional uplink resources for one or more supplemental measurement reports corresponding to the predictive estimations. For example, the request field may indicate that no additional uplink resources are requested, or that additional uplink resources are requested. If additional uplink resources are requested, the network entity may allocate associated uplink resources and the UE may transmit the additional measurement report using the additional uplink resources. In some implementations, the UE may request additional uplink resources if the predictive estimations indicate a change in measurements (such as a different order in a ranking of beam measurement values that may trigger a beam change) before a next scheduled measurement report.

Particular implementations of the subject matter described in this disclosure can be implemented to realize one or more of the following potential advantages. A UE may request uplink resources for transmission of measurement reports in addition to one or more scheduled measurement reports (such as in addition to periodic CSI reports), which may allow for a beam switch or handover more quickly after a change in channel conditions than would occur with only the one or more scheduled measurement reports. Transmission of such additional measurement reports associated with a request from the UE may provide for efficient use of wireless resources while allowing relatively fast beam switch and handover determinations in the event of changing channel conditions. Further, and as a result of efficient requests for and allocation of uplink resources for additional measurement reports, the UE and the system may experience greater reliability and lower signaling overhead, and the UE may experience reduced power consumption. As such, the UE and the system may experience higher data rates, greater spectral efficiency, enhanced reliability, and greater system capacity, among other benefits.

FIG. 1 illustrates an example of a wireless communications system 100 that supports measurement report resource management in wireless communications. The wireless communications system 100 may include one or more network entities (such as one or more base stations (BSs) 105), one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations, and any one or more of such components may be referred to herein as a network entity. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHZ, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (such as by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some implementations, the beam direction associated with transmissions along a single beam direction may be determined or otherwise ascertained, obtained, or selected from a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (such as by a BS 105 or a UE 115) may be performed using multiple beam directions, and the device may use a combination of digital precoding or radio frequency beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (such as when receiving a data signal). The single receive configuration may be aligned in a beam direction determined or otherwise ascertained, obtained, or selected based on listening according to different receive configuration directions (such as a beam direction determined or otherwise ascertained, obtained, or selected to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

In some systems, such as the wireless communications system 100, UEs 115 may transmit one or more measurement reports that may be used for management of communications at the UE 115. For example, measurement reports may be used for selection and management of beams that are used for communications, for handover of UEs 115 between serving cells, and for power control of transmissions, among other uses. In some implementations, a UE 115 may be configured to transmit one or more scheduled measurement reports according to a first periodicity (such as semi-persistent CSI reporting that may be configured in which the UE 115 transmits a CSI report every 80 ms that includes reference signal measurements), and the UE 115 may determine, or otherwise ascertain, obtain, or select that one or more additional measurement reports may provide enhanced measurement information relative to the scheduled measurement reports. For example, the UE 115 may perform predictive estimations of channel parameters that indicate a change in channel conditions is likely to occur prior to a scheduled measurement report. In some implementations, in order to provide information related to the predictive estimations, a measurement report transmitted by the UE 115 may include a request field that indicates whether additional uplink resources are requested for the one or more additional measurement reports. For example, the request field may indicate that no additional uplink resources are requested, or that additional uplink resources are requested.

In some implementations, upon receiving a request for additional uplink resources, a BS 105 may allocate uplink resources for one or more additional measurement reports and the UE 115 may transmit the one or more additional measurement reports using the additional uplink resources. In some implementations, the request field may be a one-bit or multi-bit field that is provided with a measurement report (such as a 2-bit field provided with a CSI report). For example, a first bit value of the request field may indicate that no additional uplink resources are requested, and one or more remaining bit values may indicate that additional uplink resources are requested, a type of requested resources, or any combinations thereof. In some implementations, the one or more remaining bit values of the request field may have a one-to-one mapping to a measurement report configuration ID or a request state that includes a measurement report configuration ID and a time offset for the requested uplink resources. In some other implementations, the one or more remaining bit values of the request field may have a one-to-many mapping to multiple measurement report configuration IDs or request states that include a measurement report configuration ID and a time offset for the requested uplink resources, and a particular report configuration ID, time offset, or both, may be associated with one or more configured parameters (such as an event that triggered the measurement report, or control information provided to the UE, that may indicate a report configuration ID and time offset for transmission of the additional measurement report). Additionally, or alternatively, in some implementations the one or more remaining bit values may indicate that uplink resources for a measurement report associated with predictive measurements are requested, or that uplink resources for measured reference signals are requested along with associated reference signal transmissions. In some implementations, one or more additional measurement reports may be transmitted using time domain differential reporting in which differences from a prior measurement report and provided in the one or more additional measurement reports.

Figure 2:
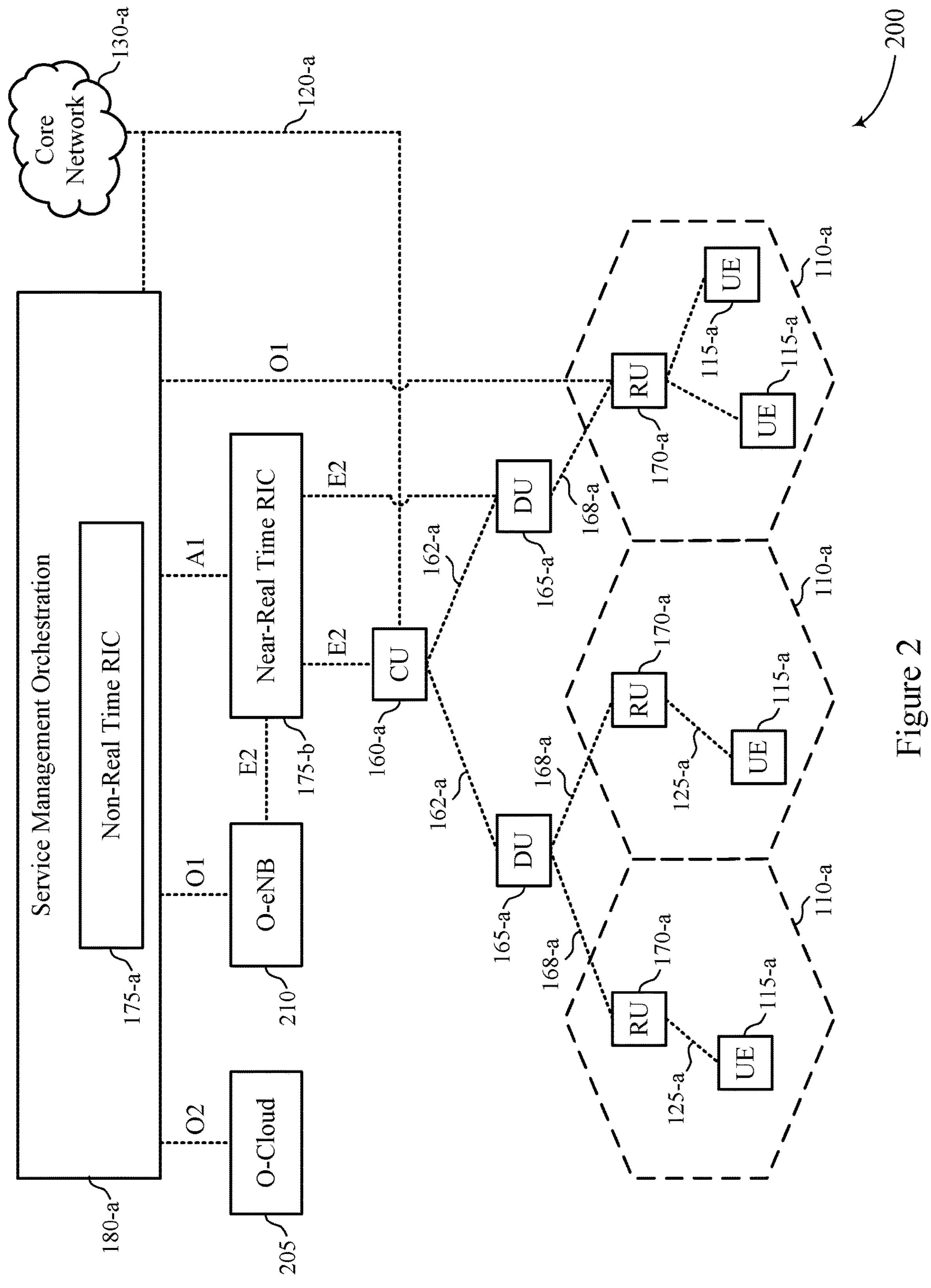
FIG. 2 shows an example of network architecture that supports measurement report resource management in wireless communications.

FIG. 2 illustrates an example of a network architecture 200 (such as a disaggregated BS architecture, a disaggregated RAN architecture) that supports measurement report resource management in wireless communications. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities (such as a Near-RT RIC 175-*b* via an E2 link, or a Non-RT RIC 175-*a* associated with an SMO 180-*a* (such as an SMO Framework), or both). A CU 160-*a* may communicate with one or more DUs 165-*a* via respective midhaul communication links 162-*a* (such as an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities of the network architecture 200 (such as CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity, or an associated processor (such as a controller) providing instructions to an interface of the network entity, may be configured to communicate with one or more of the other network entities via the transmission medium. For example, the network entities may include a wired interface configured to receive or transmit signals over a wired transmission medium to one or more of the other network entities. Additionally, or alternatively, the network entities may include a wireless interface, which may include a receiver, a transmitter, or transceiver (such as an RF transceiver) configured to receive or transmit signals, or both, over a wireless transmission medium to one or more of the other network entities.

In some implementations, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (such as CU-UP), control plane functionality (such as CU-CP), or a combination thereof. In some implementations, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (such as BS functions, RAN functions) to control the operation of one or more RUs 170-*a*. In some implementations, a DU 165-*a* may host, at least partially, one or more of an RLC layer, a MAC layer, and one or more aspects of a PHY layer (such as a high PHY layer, such as modules for FEC encoding and decoding, scrambling, modulation and demodulation, or the like) depending, at least in part, on a functional split, such as those defined by the 3rd Generation Partnership Project (3GPP). In some implementations, a DU 165-*a* may further host one or more low PHY layers. Each layer may be implemented with an interface configured to communicate signals with other layers hosted by the DU 165-*a*, or with control functions hosted by a CU 160-*a*.

In some implementations, lower-layer functionality may be implemented by one or more RUs 170-*a*. For example, an RU 170-*a*, controlled by a DU 165-*a*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some implementations, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities. For non-virtualized network entities, the SMO 180-*a* may be configured to support the deployment of dedicated physical resources for RAN coverage requirements which may be managed via an operations and maintenance interface (such as an O1 interface). For virtualized network entities, the SMO 180-*a* may be configured to interact with a cloud computing platform (such as an O-Cloud 205) to perform network entity life cycle management (such as to instantiate virtualized network entities) via a cloud computing platform interface (such as an O2 interface). Such virtualized network entities can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, AI or ML workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (for example via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via 01) or via generation of RAN management policies (such as A1 policies).

Figure 3:
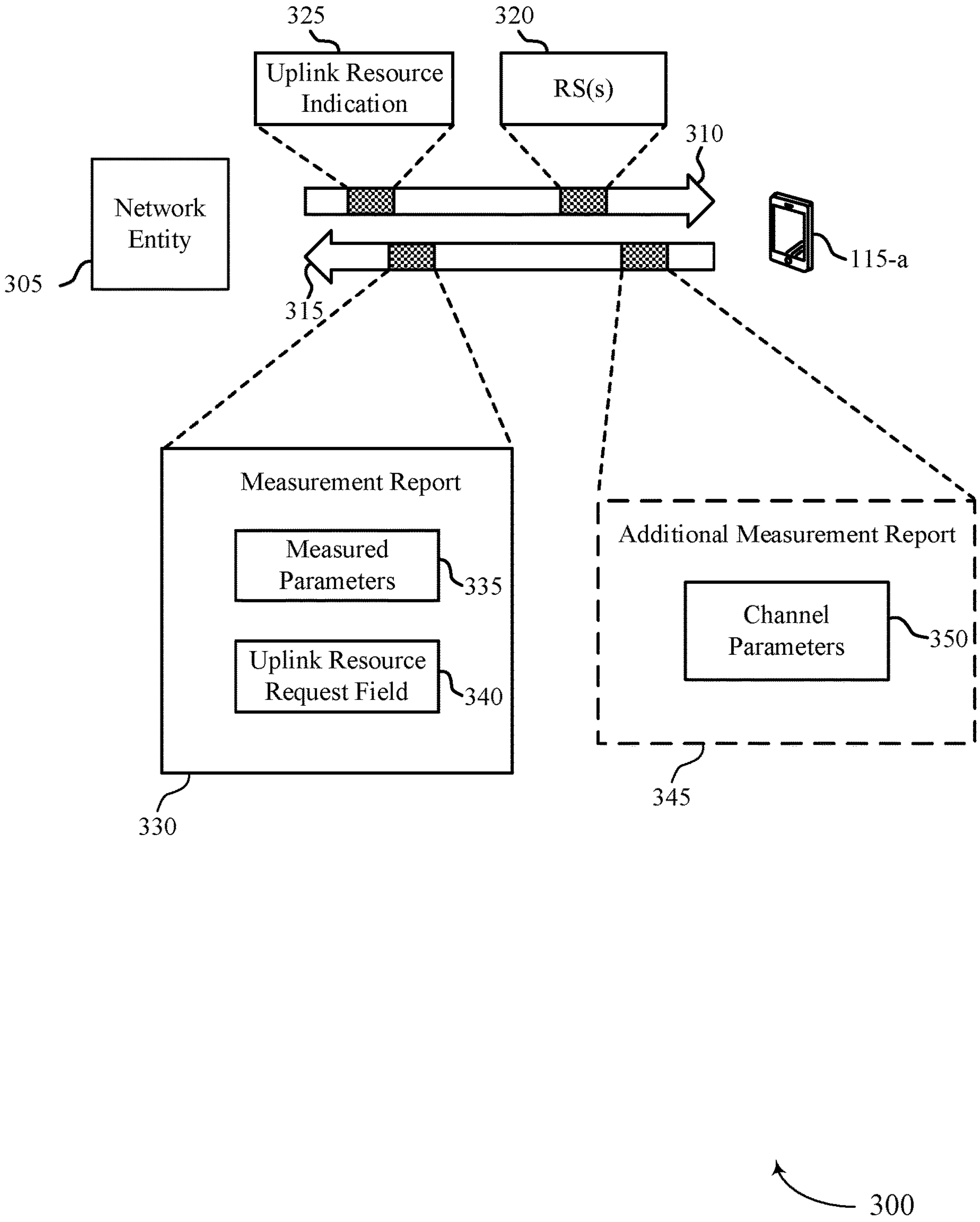
FIG. 3 shows an example of a signaling diagram that supports measurement report resource management in wireless communications.

FIG. 3 illustrates an example of a signaling diagram 300 that supports measurement report resource management in wireless communications. The signaling diagram 300 may implement or be implemented to realize aspects of the wireless communications system 100 or the network architecture 200. For example, the signaling diagram 300 may illustrate communication between a UE 115-*a* and a network entity 305 (such as a BS 105 or one or more components of a disaggregated BS such as a CU 160, DU 165, or RU 170), which may be examples of a UE 115, a BS 105, a CU 160, a DU 165, or an RU 170 as illustrated by and described with reference to FIGS. 1 and 2. In some implementations, the UE 115-*a* and network entity 305 may support a measurement report design capable of conveying an uplink resource request for additional uplink resources.

The network entity 305 may transmit one or more reference signals 320 via a downlink connection 310 that may be measured by the UE 115-*a*. The one or more reference signals 320 may include any type of reference signal suitable for performing channel measurements such as, for example, a CSI reference signal (CSI-RS), reference signals contained in a synchronization signal block (SSB) (such as a demodulation reference signal (DMRS) transmitted in a physical broadcast channel (PBCH)), or a phase tracking reference signal (PTRS), among others. The UE 115-*a* may measure one or more channel parameters associated with the one or more reference signals 320 such as, for example, a reference signal received power (RSRP), a reference signal received quality (RSRQ), a signal to noise ratio (SNR), a signal to interference and noise ratio (SINR), channel quality information (CQI), a precoding matrix indicator (PMI), a CSI-RS resource indicator (CRI), a search space/physical broadcast channel (SS/PBCH) resource block indicator (SSBRI), a layer indicator (LI), a rank indicator (RI), or any combination thereof. The channel parameters may be layer-1 (L1) parameters, and the associated measurements of RSRP and SINR may be referred to as L1-RSRP and L1-SINR. The UE 115-*a* may transmit the associated measurement report 325 to the network entity 305 via an uplink connection 315. The measurement report 325 may include, in some implementations, a set of measured parameters 330 and an uplink resource request field 335.

In some implementations, the UE 115-*a* may be capable of performing predictive estimations of measurements for one or more future time periods. For example, the UE 115-*a* may use a predictive estimation model (such as an AI or ML model) to estimate channel conditions for one or more future time periods based on the one or more measurements of the received reference signals 320 and the predictive estimation model. The predictive estimations may provide for updated measurements and allow the UE 115-*a*, for example, to anticipate when a beam change from a first beam to a second beam, or a handover between serving cells, may be needed. In some implementations, the uplink resource request field 335 may indicate whether the UE 115-*a* requests additional uplink resources for the one or more additional measurement reports, or whether no additional uplink resources are requested. In the event that the uplink resource request field 335 indicates a request for additional uplink resources, the network entity 305 may allocate the additional uplink resources and provide an uplink resource indication 340 to the UE 115-*a*. The UE 115-*a* may transmit an additional measurement report 345 using the indicated uplink resources, which may include channel parameters 350 such as estimated or measured parameters, or both.

In some implementations of the present disclosure, the uplink resource request field 335 may be a one-bit or multi-bit field that indicates whether additional uplink resources are requested. Further, in some implementations, the uplink resource request field 335 may indicate a report or resource type that is requested. For example, a first bit value of the uplink resource request field 335 may indicate that no additional uplink resources are requested, and one or more remaining bit values may indicate that additional uplink resources are requested, a type of requested resources, or any combinations thereof. Additionally, or alternatively, in some implementations the one or more remaining bit values may indicate whether the UE 115-*a* requests to transmit the additional measurement report 345 with actual reference signal measurements (such as measurements of one or more additional reference signals 320 transmitted by the network entity 305 that are associated with the uplink resource request) with predictive measurements, or both. In some implementations, one or more additional measurement reports may be transmitted using time domain differential reporting in which differences from a prior measurement report and provided in the one or more additional measurement reports. Additionally, or alternatively, in some implementations the one or more additional measurement reports may include parameters associated with mobility of the UE 115-*a* (such as the UE 115-*a* transmitting L1-RSRPs and L1-SINRs of one or multiple CSI-RS or SSB resources associated with a non-activated serving cell), or to indicate RI or CQI parameters associated with the L1-RSRPs or L1-SINRs.

In some implementations, the network entity 305 may perform beam management or mobility management using information from the measurement report 325 and the additional measurement report 345. The additional channel parameters of the additional measurement report 345 may be provided, in some implementations, prior to a subsequent regularly scheduled measurement report, and may thus allow for a beam switch to be initiated sooner than in scenarios where the additional measurement report 345 is not provided. In some implementations, the UE 115-*a* may not request the additional uplink resources in scenarios where it is not predicted that channel parameters will change significantly from the reported measured parameters 330. Thus, in scenarios where the UE 115-*a* predicts channel conditions are changing relatively quickly, additional uplink resources may be requested to provide for faster beam updates, and in scenarios where the UE 115-*a* predicts channel conditions are relatively stable additional uplink resources are not requested and such resources may be used for other network traffic.

Figure 4:
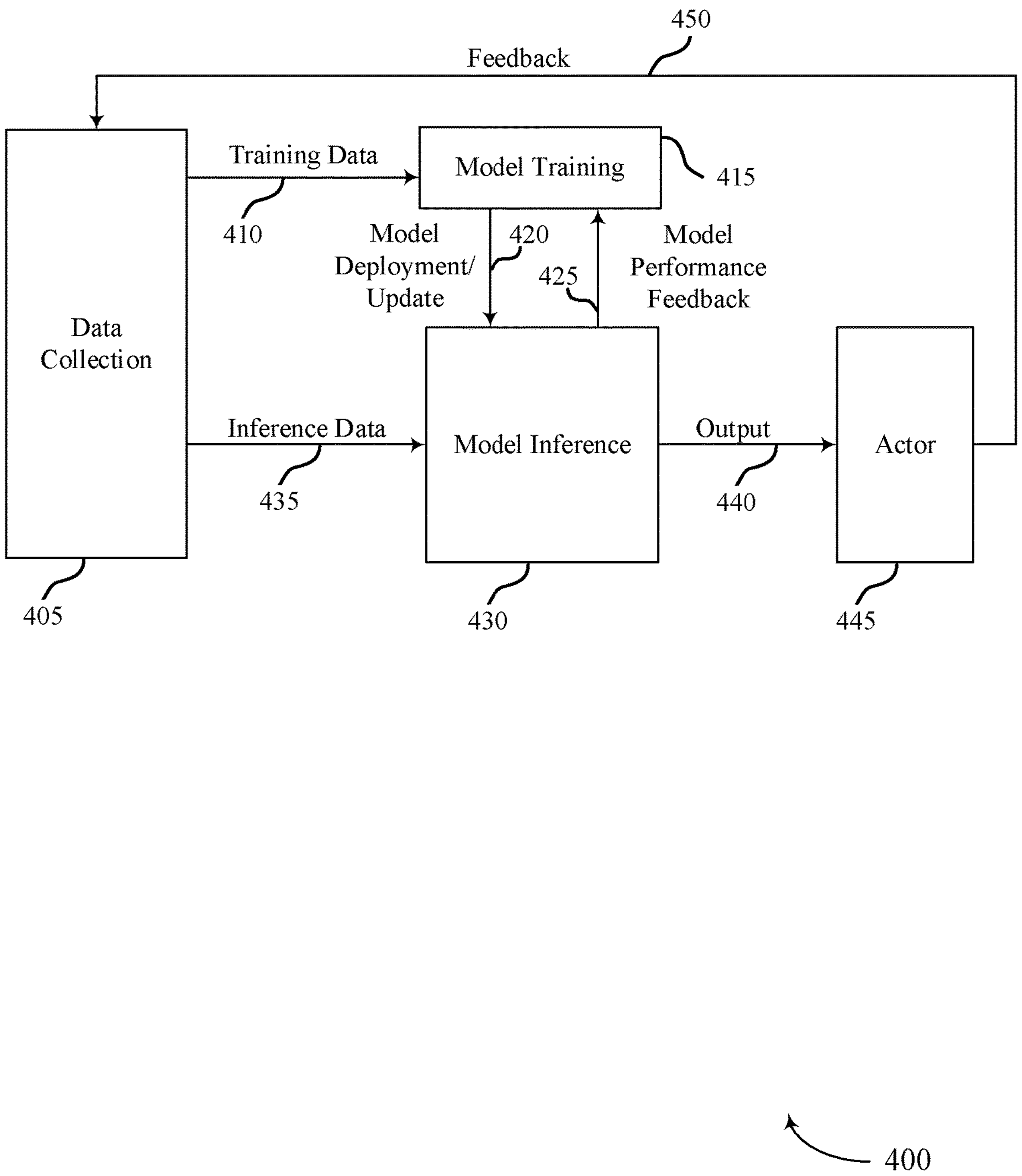
FIG. 4 shows an example of a predictive measurement architecture that supports measurement report resource management in wireless communications.

FIG. 4 illustrates an example of a predictive measurement architecture 400 that supports measurement report resource management in wireless communications. The predictive measurement architecture 400 may implement or be implemented to realize aspects of the wireless communications system 100, the network architecture 200, or the signaling diagram 300. For example, the predictive measurement architecture 400 may be implemented by a UE, which may be an example of a UE 115 as illustrated by and described with reference to FIGS. 1-3, to determine or otherwise ascertain, obtain, or select one or more predicted channel parameters for communications with a network entity as illustrated by and described with reference to FIGS. 1-3.

In some implementations, the predictive measurement architecture 400 may include a data collection function 405, which may be a function that provides input data as training data 410 to a model training function 415 and that provides inference data 435 to a model inference function 430. Examples of input data may include channel measurement data from one or more reference signals for one or more beams or SSBs that are transmitted by one or more network entities, feedback from actor function 445, output from a predictive model (such as an AI or ML model), or any combinations thereof. The training data 410 may be provided as input for the model training function 415 to generate model outputs on which feedback may be provided to tune the predictive model, for example. In some implementations, the model training function 415 may perform ML or AI model training, validation, and testing, which may generate model performance metrics as part of a model testing procedure. The model training function 415, in some implementations, also may provide data preparation (such as data pre-processing and cleaning, formatting, and transformation) based on training data 410 delivered by the data collection function 405. The model training function 415 may provide model deployment and update data 420 that may be used to initially deploy a trained, validated, and tested predictive model to the model inference function 430, or to deliver an updated model to the model inference function 430.

The data collection function 405 also may provide inference data 435 as an input for the model inference function 430. In some implementations, the model inference function 430 may provide predictive model inference output (such as predictions or decisions). In some implementations, the model inference function 430 may provide model performance feedback 425 to the model training function 415. The model inference function 430, in some implementations, also may provide data preparation (such as data pre-processing and cleaning, formatting, and transformation) based on inference data 435 delivered by the data collection function 405. The inference output 440 of the predictive model produced by the model inference function 430 may be provided to an actor function 445. In some implementations, the actor function 445 may trigger or perform one or more actions based on the inference output 440. For example, the actor function 445 may determine or otherwise ascertain, obtain, or select an indication that one or more predicted measurement parameters provided in the inference output 440 indicates that a beam change or handover is likely to be triggered, and may provide an indication to request additional uplink resources for transmission of one or more additional measurement reports.

In some implementations, the model inference function 430 may be implemented by, for example, a convolutional neural network (CNN), a recurrent neural network (RNN), or a long short-term memory (LSTM) network, and may predict measurement parameters as part of a hierarchical beam refinement (such as part of P1/P2/P3 beam refinement procedures) using CSI-RS beam sweeps used for beam refinement and maintenance. For example, predicted measurement parameters may indicate a different ranking of beam RSRP values than provided in a prior measurement report, and the actor function 445 may provide an indication to a communications manager, or other component, at the UE that the uplink resource request field should be set to a value that requests additional uplink resources. In some implementations, the actor function 445 also may provide predicted channel measurement parameters for inclusion with an additional measurement report. In some implementations, the actor function 445 also may provide feedback information 450 that may be used to derive training or inference data or performance feedback. In some implementations, a UE may determine or otherwise ascertain, obtain, or select an indication of predicted channel parameters for one or more time instances that fall between measurement reports that are scheduled at the UE, such as periodic or semi-persistent CSI reports that are configured at the UE.

Figure 5:
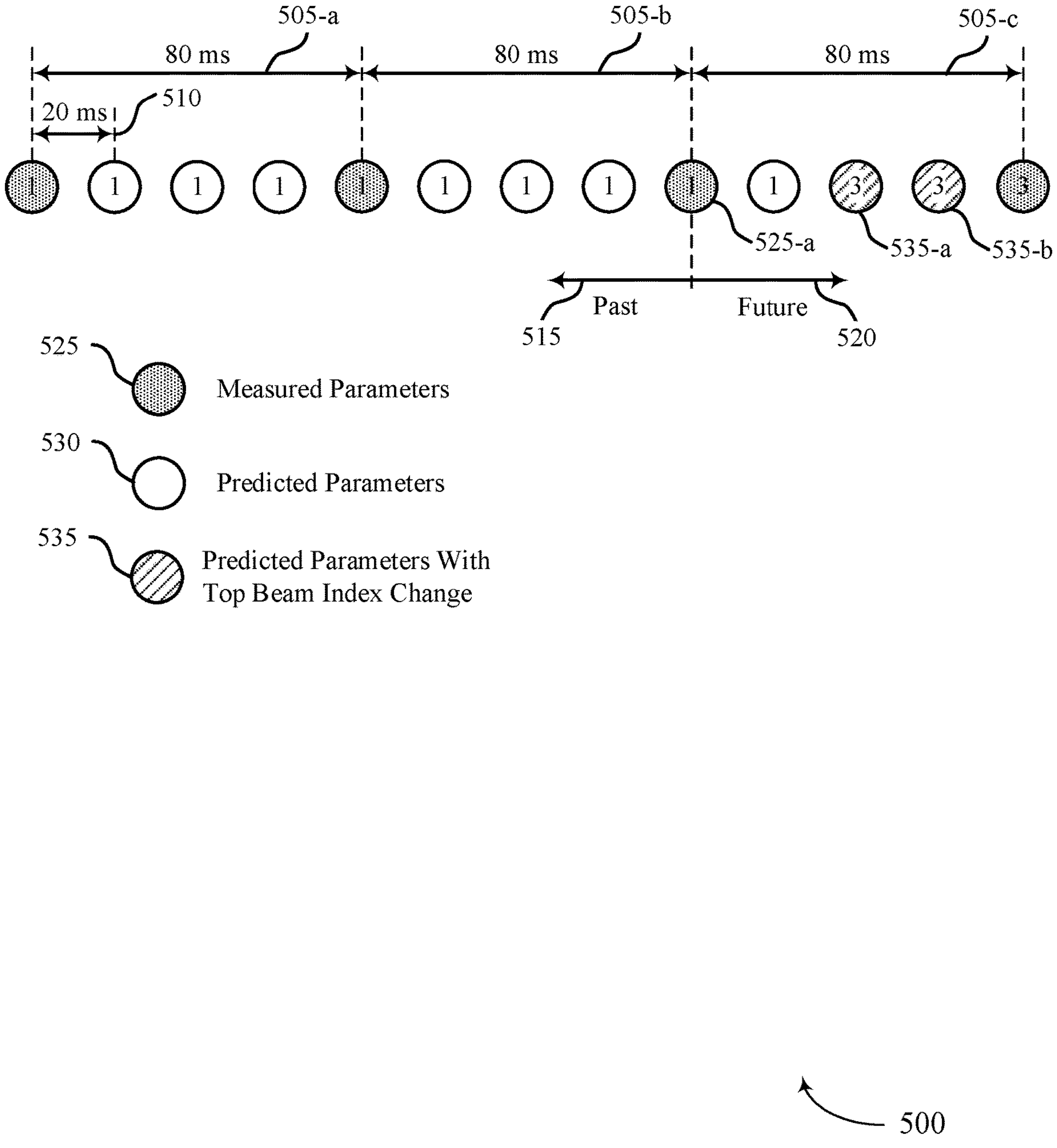
FIG. 5 shows an example of actual and predictive measurement timing that supports measurement report resource management in wireless communications.

FIG. 5 illustrates an example of actual and predictive measurement timing 500 that supports measurement report resource management in wireless communications. The actual and predictive measurement timing 500 may implement or be implemented to realize aspects of the wireless communications system 100, the network architecture 200, or the signaling diagram 300. For example, the actual and predictive measurement timing 500 may be implemented by a UE, which may be an example of a UE 115, a network entity, or both, as illustrated by and described with reference to FIGS. 1-3, to report measured channel parameters, predicted channel parameters, or any combinations thereof.

In the example, of FIG. 5, a UE may be configured with a first measurement periodicity having 80 ms measurement periods 505, to provide a first measurement period 505-*a*, a second measurement period 505-*b*, and a third measurement period 505-*c*. In this example, a second periodicity is configured such that the UE determines or otherwise ascertains, obtains, or selects predicted channel measurements for 20 ms periods 510. For example, measurement data may be provided to predictive measurement architecture 400 to generate predicted channel measurements for each period 510. In the example of FIG. 5, the first measurement period 505-*a* and the second measurement period 505-*b* are past measurement periods 515, and the third measurement period 505-*c* is a future measurement period 520. The UE, according to the first measurement periodicity, may measure reference signals and transmit measured parameters 525, and also may determine or otherwise ascertain, obtain, or select predicted parameters 530 for the second periodicity. As discussed herein, in some scenarios the prediction at the UE may result in predicted parameters with a change in ranking of beams, such as predicted parameters with a top beam index change 535.

In some implementations, rather than transmit a measurement report for each instance of predicted parameters 530, which would result in a measurement report transmission every 20 ms, the UE may only seek to transmit measurement reports associated with the predicted parameters with a top beam index change 535. In this example, as illustrated in FIG. 5, the UE measures beam 1 as the top beam (such as due to beam 1 having a highest measured RSRP of measured beams), and predicts that beam 1 will be the top beam for each prediction instance of the first measurement period 505-*a* and the second measurement period 505-*b*, as well as a first instance of predicted parameters 530 of the third measurement period 505-*c*. However, the UE in this example predicts a change in the top beam index from beam 1 to beam 3, as indicated at the predicted parameters with a top beam index change 535. In this example, the UE may report measured parameters 525-*a*, along with a request for uplink resources field that is set to indicate additional uplink resources are requested to report a first instance of predicted parameters with a top beam index change 535-*a* and a second instance of predicted parameters with a top beam index change 535-*b*, that indicate the top beam change from beam 1 to beam 3. Thus, in this example, the UE may use increased beam measurement prediction periodicity, but only transmit an associated measurement report in the event of a predicted beam index change, which may provide increased beam management capability with a relatively low amount of overhead increase and power consumption. While the example of FIG. 5 shows that a UE may request additional uplink resources in the event of a predicted top beam change, additional uplink resources may be requested in other scenarios such as changes in predicted strongest SSBRIs or CRIs at a future time, changes in associated RSRPs or change in RSRPs at a future time, or any combinations thereof.

Figure 6A:
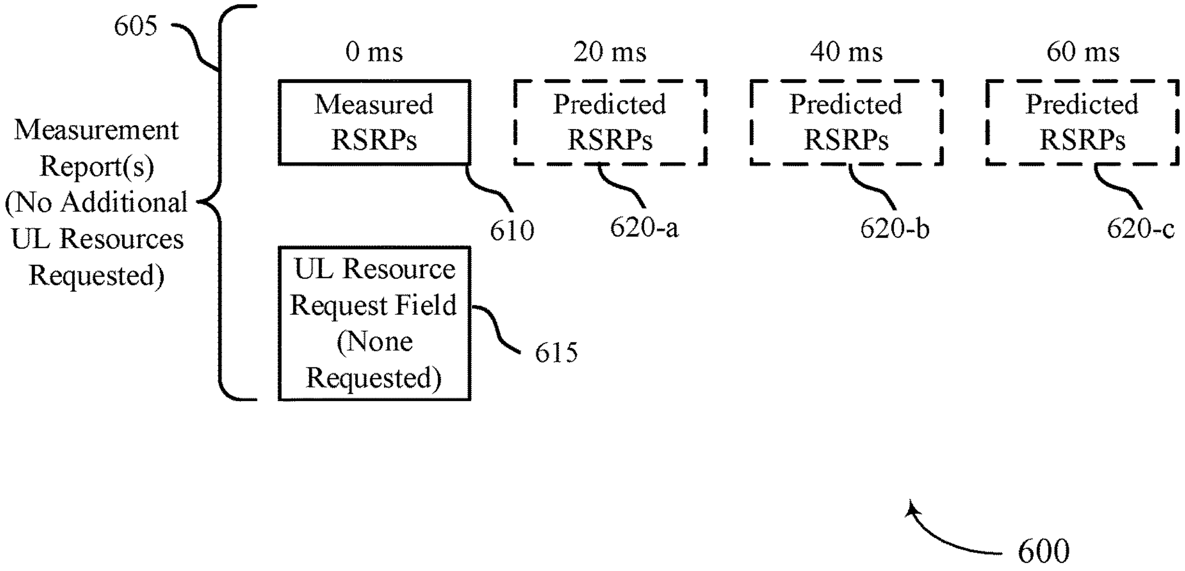
FIGS. 6A and 6B show examples of measurement reports and additional uplink resources that support measurement report resource management in wireless communications.
Figure 6B:
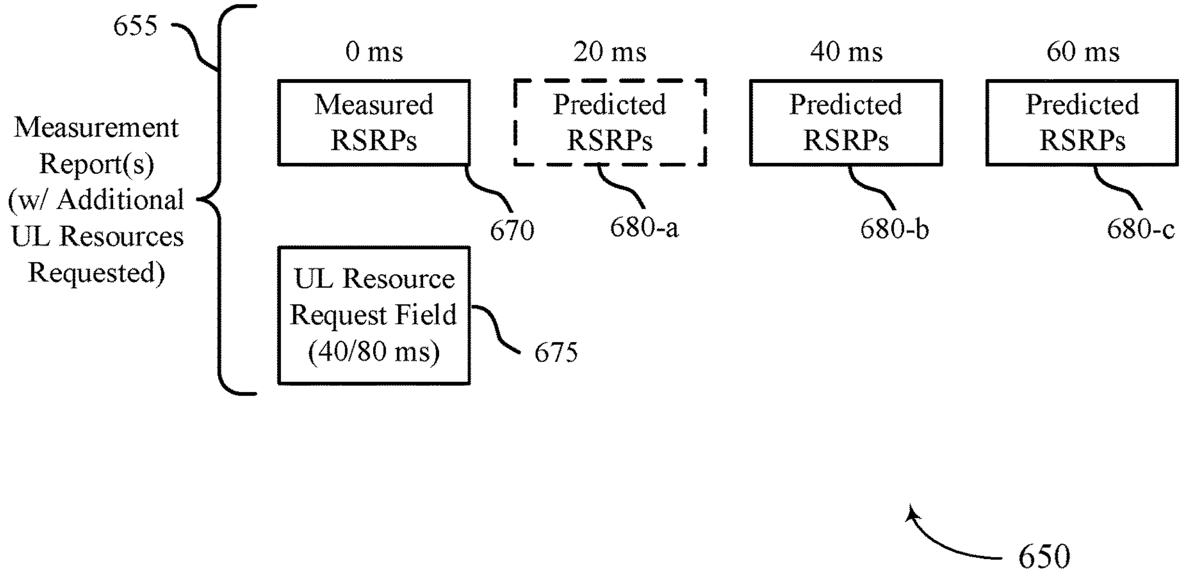

FIGS. 6A and 6B illustrate examples of measurement reports and additional uplink resources 600 and 650 that support measurement report resource management in wireless communications. The measurement reports and additional uplink resources 600 and 650 may implement or be implemented to realize aspects of the wireless communications system 100, the network architecture 200, the signaling diagram 300, or the actual and predictive measurement timing 500. For example, the measurement reports and additional uplink resources 600 and 650 may be implemented by a UE, a network entity, or both, as illustrated by and described with reference to FIGS. 1-5, to report measured channel parameters, request additional uplink resources, report predicted channel parameters, or any combinations thereof.

In a first example of measurement reports and additional uplink resources 600 as shown in FIG. 6A, measurement reports 605 include a first set of measured RSRPs 610 and a first uplink resource request field 615 that indicates that no additional uplink resources are requested. In this example, the UE may be configured to determine or otherwise ascertain, obtain, or select predicted sets of RSRPs 620 for 20 ms intervals after the reported measured RSRPs 610. The UE may determine or otherwise ascertain, obtain, or select an indication that none of a first set of predicted RSRPs 620-*a*, a second set of predicted RSRPs 620-*b*, or a third set of predicted RSRPs 620-*c* indicate a change in measurement parameters that would be likely to trigger a beam change. In the event of such a determination or indication, the UE may set the bit value of the uplink resource request field 615 to indicate that additional uplink resources are not requested.

In a second example of measurement reports and additional uplink resources 650 as shown in FIG. 6B, measurement reports 655 include a first set of measured RSRPs 670 and a first uplink resource request field 675 that indicates that additional uplink resources are requested for transmission of measurement reports. In this example, similarly to the example shown in FIG. 6A, the UE may be configured to determine or otherwise ascertain, obtain, or select predicted sets of RSRPs 680 for 20 ms intervals after the reported measured RSRPs 670. The UE may determine or otherwise ascertain, obtain, or select that a first set of predicted RSRPs 680-*a* does not indicate a change in measurement parameters that would be likely to trigger a beam change. However, in this example, the UE may determine or otherwise ascertain, obtain, or select that a second set of predicted RSRPs 680-*b* and a third set of predicted RSRPs 680-*c* indicate a change in measurement parameters that would be likely to trigger a beam change (such as due to a change in a predicted strongest beam, or changes in parameters exceeding a threshold such as a certain percentage change). Thus, in this example, the UE may provide a measurement report with measured RSRPs 670 and an uplink resource request field 675 that is set to indicate a request for additional uplink resources for additional measurement reports. In the example of FIG. 6B, the uplink resource request field 675 may request additional uplink resources for a second measurement report with the second set of predicted RSRPs 680-*b* and a third measurement report with the third set of predicted RSRPs 680-*c*. In some implementations, as discussed herein, the uplink resource request field 675 also may be linked with different types of semi-persistent (SP) or aperiodic (AP) measurement reports (such as SP or AP CSI reports) such that the UE can have flexibility to request different kinds of uplink resources in terms of periodicity, payload size, latency, or any combinations thereof, depending on its predicted beam variation level.

While this example shows the second measurement report and third measurement report as reporting predicted RSRPs, in some other implementations the one or more additional measurement reports may provide predicted or measured RSRPs or SINRs. For example, the one or more additional measurement reports may include L1-RSRPs that are predicted for the associated CSI-RS or SSB resources for one or more future time instances (such as one or more time instances defined in a specification or configured by a network entity). In some implementations, a future time instance may be defined as a slot carrying the additional measurement reports linked with bit-points of the uplink resource request field 675 that indicate additional uplink resources are requested. In some other implementations, the one or more future time instances may be configured or dynamically indicated to the UE. Additionally, or alternatively, the one or more future time instances may be indicated by the UE through selection of a bit point of the uplink resource request field 675, where different bit points are mapped to different time offsets relative to a timing of an initial measurement report with the first set of measured RSRPs 670.

In implementations in which the one or more additional measurement reports include measured RSRPs or SINRs, the UE may identify CSI-RS or SSB resources that are scheduled and associated with the one or more future time instances. The UE may measure the identified CSI-RS or SSB resources, and provide the measured RSRPs or SINRs in the one or more additional measurement reports. In some implementations, one or more bit points of the uplink resource request field 675 may indicate a request for providing measured parameters, and one or more other bit points of the uplink resource request field 675 may indicate a request for providing predicted parameters.

Figure 7:
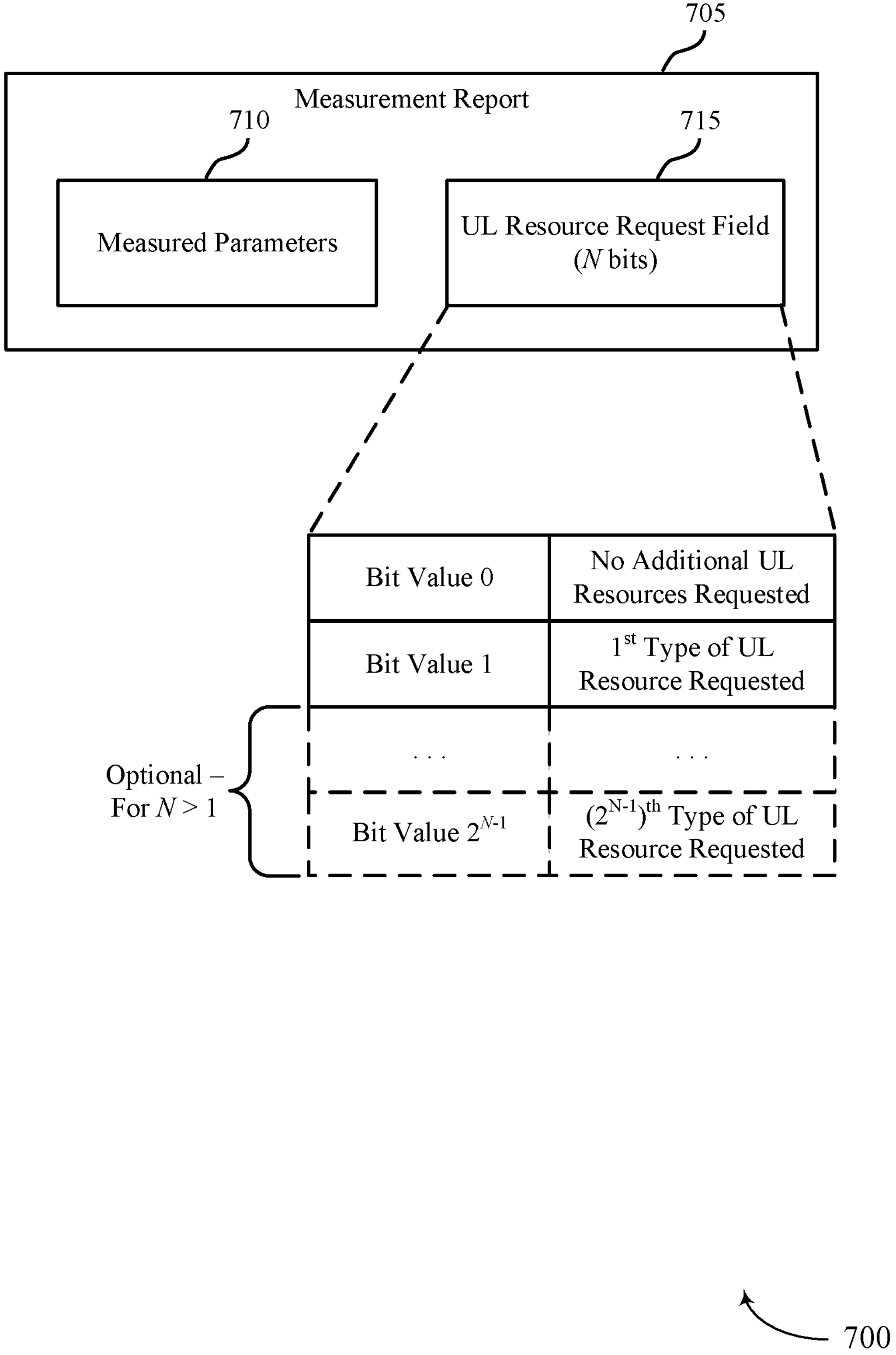
FIG. 7 shows an example of a measurement report with uplink resource request indication that supports measurement report resource management in wireless communications.

FIG. 7 illustrates an example of a measurement report with uplink resource request indication 700 that supports measurement report resource management in wireless communications. The measurement report with uplink resource request indication 700 may implement or be implemented to realize aspects of the wireless communications system 100, the network architecture 200, the signaling diagram 300, the actual and predictive measurement timing 500, or measurement reports and additional uplink resources 600 and 650. For example, the measurement report with uplink resource request indication 700 may be implemented by a UE 115, a network entity, or both, as illustrated by and described with reference to FIGS. 1-6, to report measured channel parameters, indicate whether additional uplink resources are requested, indicate a type of additional uplink resources requested, or any combinations thereof.

For example, a measurement report 705, such as a CSI report, may include measured parameters 710 and an uplink resource request field 715. The measured parameters may include, for example, RSRP measurements for one or more reference signals associated with one or more beams. The uplink resource request field 715 may include, for example, N bits, N being a positive integer, that may be used to indicate whether additional uplink resources are requested and, if so, in some implementations also may indicate a type of uplink resources requested. In some implementations, the uplink resource request field 715 may be a single bit (such as N=1) to indicate whether or not additional uplink resources are requested. In some implementations, such an indication may be associated with a configured future time instance, or more than one configured future time instances, associated with the measurement report 705. For example, the measurement report 705 may be a CSI report that is configured with a first periodicity for transmissions of periodic CSI reports and a second periodicity associated with additional uplink resources within the first periodicity. In one specific example, a first periodicity of 80 ms may be configured, along with a second periodicity of 20 ms such that in scenarios where additional uplink resources are requested and granted, three additional sets of uplink resources are provided prior to a next CSI report having the first periodicity.

In some other implementations, the uplink resource request field 715 may be a multi-bit field (such as N>1). In such implementations, a first bit value (such as bit value 0) may indicate that no additional uplink resources are requested, and remaining bit values may indicate a type of uplink resource requested. In the example shown in FIG. 7, a second bit value (such as bit value 1) may indicate that a first type of uplink resources are requested, and so on, until a $K^{th}$ bit value (such as bit value $2^N-1$) indicates a $K^{th}$ type of uplink resources are requested, K being a positive integer. The different types of uplink resources may be configured, in some implementations, with the measurement configuration that provides a mapping between the types of uplink resources and the K bit values. For example, a UE may be configured with a first periodic or SP CSI report setting with report quantity that includes a set of measured L1-RSRPs or L1-SINRs associated with a first group of CSI-RS or SSB resources of a CSI-RS or SSB resource set as channel measurement resource (CMR) for the CSI report setting. The UE also may be configured with the uplink resource request field 715 and a number of bits (N) for indicating whether, and optionally what kind of, additional uplink resources are requested by the UE to further report predicted or measured future L1-RSRPs or L1-SINRs associated with one or multiple second groups of CSI-RS or SSB resources of the CSI-RS or SSB resource set.

In some implementations, an indication of the first bit value in the uplink resource request field 715 that indicates no additional uplink resources are requested also may indicate that, for a future time instance, at least the CSI-RS or SSB resource ID associated with a strongest L1-RSRP or L1-SINR among the CSI-RS or SSB resources within the CSI-RS or SSB resource set, is predicted to be the same as reported in the measured parameters 710. In such implementations, an indication of one of the remaining bit-points may indicate that for the future time instance, at least the CSI-RS or SSB resource ID associated with the strongest L1-RSRP or L1-SINR among the CSI-RS or SSB resources within the CSI-RS or SSB resource set, is predicted to be different from the strongest that is reported in the measured parameters 710. In some implementations, the future time instance may be a predetermined time instance, or may be configured with the measurement report configuration.

In some implementations, the requested additional uplink resources may be used for providing one or more additional measurement reports, such as for reporting L1-RSRPs or L1-SINRs, which may be reported differentially in the time domain. Such differential reporting may provide each reported L1-RSRP or L1-SINR in the one or more additional measurement reports as a difference value from a reference value reported in an initial measurement report. In some implementations, the reference value from the initial measurement report may be a strongest reported L1-RSRP or L1-SINR, and each reported value in the one or more additional measurement reports may be a difference from the reference value.

In some other implementations, the reference value from the initial measurement report may be measurement value for an indicated CSI-RS resource ID or SSB resource ID, which may not be a strongest reported L1-RSRP or L1-SINR from the initial measurement report, and each reported value in the one or more additional measurement reports may be a difference from the reference value. A differential reporting configuration with measurements reported as a difference from the strongest reported L1-RSRP or L1-SINR may have less overhead for configuring the measurement reports, due to not having to provide a CSI-RS resource ID or SSB resource ID that identifies a reference value. Alternatively, a differential reporting configuration with measurements reported as a difference from a reference value of an indicated CSI-RS resource ID or SSB resource ID may have less overhead for the measurement report itself if there is a relatively large variation between the strongest reported L1-RSRP or L1-SINR and one or more lower reported L1-RSRP or L1-SINR values such that additional bits would be needed to indicate the differential value.

In some implementations, the UE may be able to determine or obtain an indication of which option will consume less overhead for the predicted future L1-RSRP or L1-SINR values and a variation from the strongest reported L1-RSRP or L1-SINR of the initial measurement report. In some implementations, whether a differential report is relative to the strongest reported L1-RSRP or L1-SINR from the initial measurement report or is relative to an indicated resource ID may be configured with the measurement report configuration, may be indicated to the UE dynamically in control information, or may be selected by the UE and an indication provided with the initial measurement report.

In some implementations, the one or more additional measurement reports may be provided for beam management, as discussed herein. Additionally, or alternatively, the one or more additional measurement reports may be used for mobility management, and the requested additional uplink resources may be used for reporting L1-RSRPs or L1-SINRs of one or more CSI-RS or SSB resources associated with a non-activated serving cell. Thus, the one or more additional measurement report settings may be associated with a non-activated serving cell whose physical cell identification (PCI) is different from the PCI of the cell on which the initial measurement report is provided. A network entity that receives the one or more additional measurement reports may evaluate whether a handover of the UE should be triggered. In implementations where bit values of the uplink resource request indication are mapped to multiple measurement report settings, the measurement report associated with a non-activated serving cell may be transmitted upon receipt of an indication in control information (such as an enhanced CSI requested field indicated by downlink control information (DCI) format 0_1), in which a measurement report request field and associated triggering state(s) may indicate CSI report settings associated with a non-activated serving cell.

In further implementations, additionally, or alternatively, the one or more additional measurement reports may be used to provide a rank indicator (RI) or channel quality indicator (CQI). For example, one or more additional measurement reports also may include report quantities of RI or CQI determined or otherwise ascertained, obtained, or selected from the L1-RSRPs or L1-SINRs reported in the one or more additional measurement reports. In some implementations, the reported RI or CQI may be differentially reported relative to a corresponding value provided in an initial measurement report.

Figure 8A:
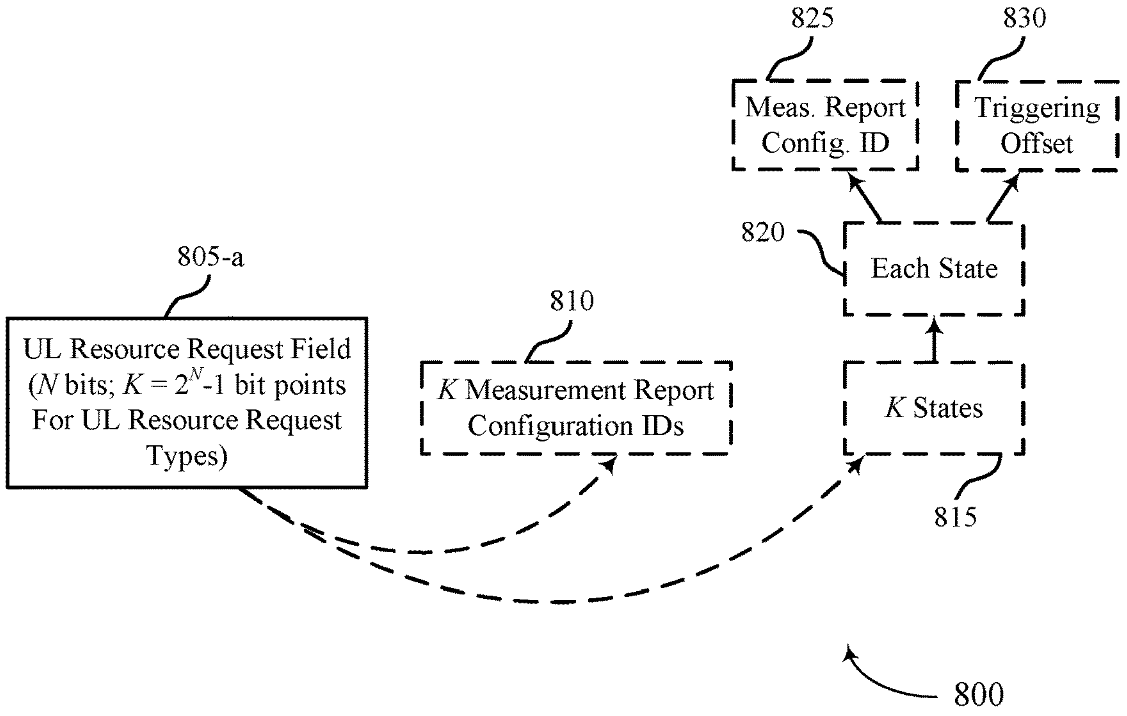
FIGS. 8A and 8B show examples of uplink resource request field indications that support measurement report resource management in wireless communications.
Figure 8B:
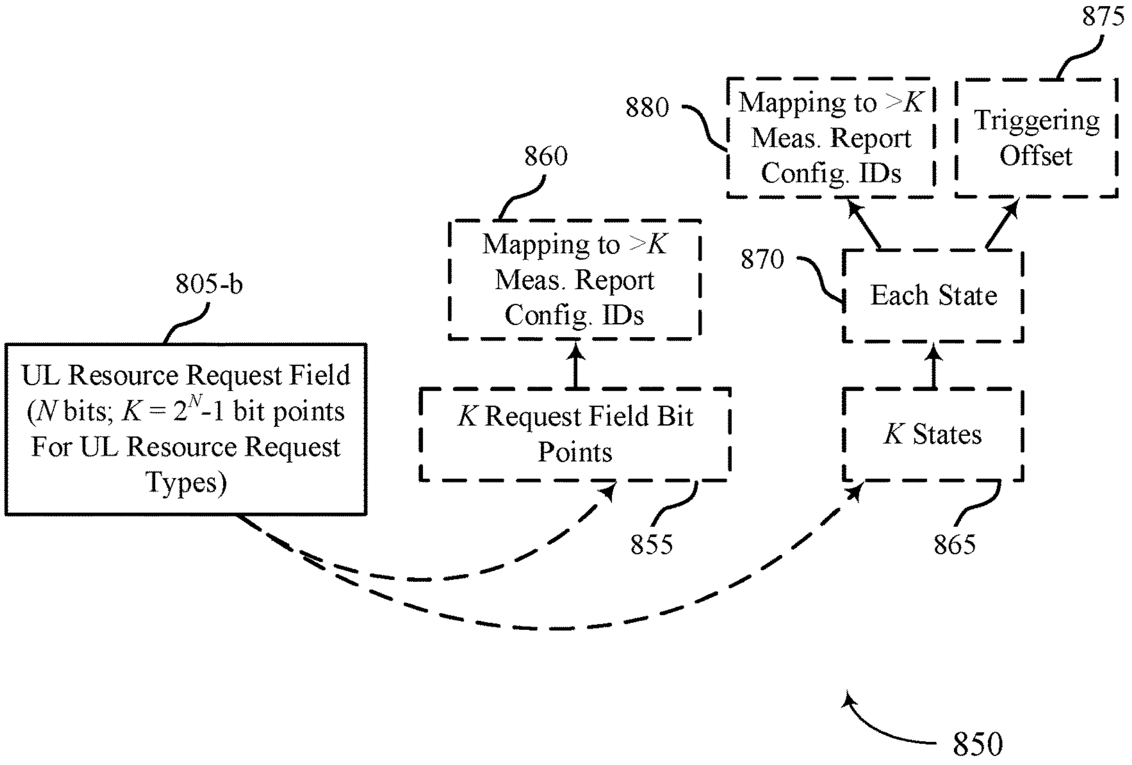

FIGS. 8A and 8B illustrate examples of uplink resource request field indications 800 and 850 that support measurement report resource management in wireless communications. The uplink resource request field indications 800 and 850 may implement or be implemented to realize aspects of the wireless communications system 100, the network architecture 200, the signaling diagram 300, the actual and predictive measurement timing 500, measurement reports and additional uplink resources 600 and 650, or measurement report with uplink resource request indication 700. For example, the uplink resource request field indications 800 may be implemented by a UE 115, a network entity, or both, as illustrated by and described with reference to FIGS. 1-7, to report measured channel parameters, indicate whether additional uplink resources are requested, indicate a type of additional uplink resources requested, or any combinations thereof.

For example, in FIG. 8A an uplink resource request field 805-*a* may be an N-bit field having K bit points or bit values, K being a positive integer, that are available to indicate uplink resource request types associated with the additional measurement reports, where $K=2^N-1$ in this example. In some implementations, the K bit points may be one-to-one mapped with K measurement report configuration IDs 810. Thus, a UE may identify that a particular measurement report configuration ID would be suitable for reporting an additional measurement report, and include the bit point in the uplink resource request field that corresponds to the identified measurement report configuration ID. The mapping of the K measurement report configuration IDs 810 to the K bit points may be provided in a measurement configuration (such as provided via RRC signaling). The measurement report configurations for reporting L1-RSRPs or L1-SINRs associated with one or more CSI-RS or SSB resources within CSI-RS or SSB resource sets may be determined or otherwise ascertained, obtained, or selected from the mapping. For example, if N=2 and there are eight SSB resources within a SSB resource set for the initial measurement report, with the initial measurement report configured with a periodicity of 100 ms and reporting of the four SSB resources with the highest measured RSRPs, the K bit points may be one-to-one mapped to three other measurement report settings. In one example, a first report setting may provide for semi-persistent measurement reporting that includes RSRPs with a periodicity of 5 ms for the four SSB resources with the highest RSRPs. For example, if reporting predicted measurements, the SSBs with the four highest predicted RSRPs may be reported. A second report setting in this example, may provide for semi-persistent measurement reporting that includes RSRPs with a periodicity of 20 ms for one SSB resource that has the highest RSRP. A third report setting in this example, may provide for an aperiodic measurement report that includes RSRPs for the four SSB resources with the highest RSRPs.

Alternatively, in the example of FIG. 8A, the K bit points may be one-to-one mapped with K states 815 in which each state 820 may have an associated measurement report configuration ID 825 and triggering offset 830. The triggering offset 830 may indicate a time domain offset between a slot carrying the initial measurement report and the uplink resource request field 805-*a* and a slot for reporting the requested additional measurement report. In some implementations, the K bit-points may be linked with K'<K measurement report settings, such as if one measurement report configuration ID 825 is included in different states with different triggering offsets 830. The mapping of the K states 815 and measurement report configuration IDs 825 and triggering offset 830 for each state 820 for the K bit points may be provided in a measurement configuration (such as provided via RRC signaling).

In some other implementations, such as shown in the example of FIG. 8B an uplink resource request field 805-*b* also may be an N-bit field having K bit points or bit values that are available to indicate uplink resource request types associated with the additional measurement reports, where $K=2^N-1$ in this example. In some implementations, the K request field bit points 855 may be one-to-many mapped with greater than K measurement report configuration IDs 860. In such implementations, multiple measurement report configuration IDs may be linked with a single bit point, and a particular measurement report configuration ID may be identified according to an indication in downlink control information (DCI). For example, DCI format 0_1 may provide current configured CSI report settings and associated one or more CSI triggering lists that may be used to identify the measurement report configuration ID from the multiple associated with one of the K bit points. Thus, the mapping of the greater than K measurement report configuration IDs 860 to the K request field bit points 855 may be provided in a measurement configuration (such as provided via RRC signaling), with the specific report configuration ID of the requested additional measurement report identified according to the indication in the DCI of the current configured report setting.

Alternatively, in the example of FIG. 8B, the K bit points may be one-to-many mapped with K states 865 in which each state 870 may have an associated triggering offset 875 and be mapped with greater than K measurement report configuration IDs 880. The triggering offset 875 may indicate a time domain offset between a slot carrying the initial measurement report and the uplink resource request field 805-*b* and a slot for reporting the requested additional measurement report. In this example, again, a particular measurement report configuration ID may be identified in an indication in downlink control information (DCI).

Figure 9:
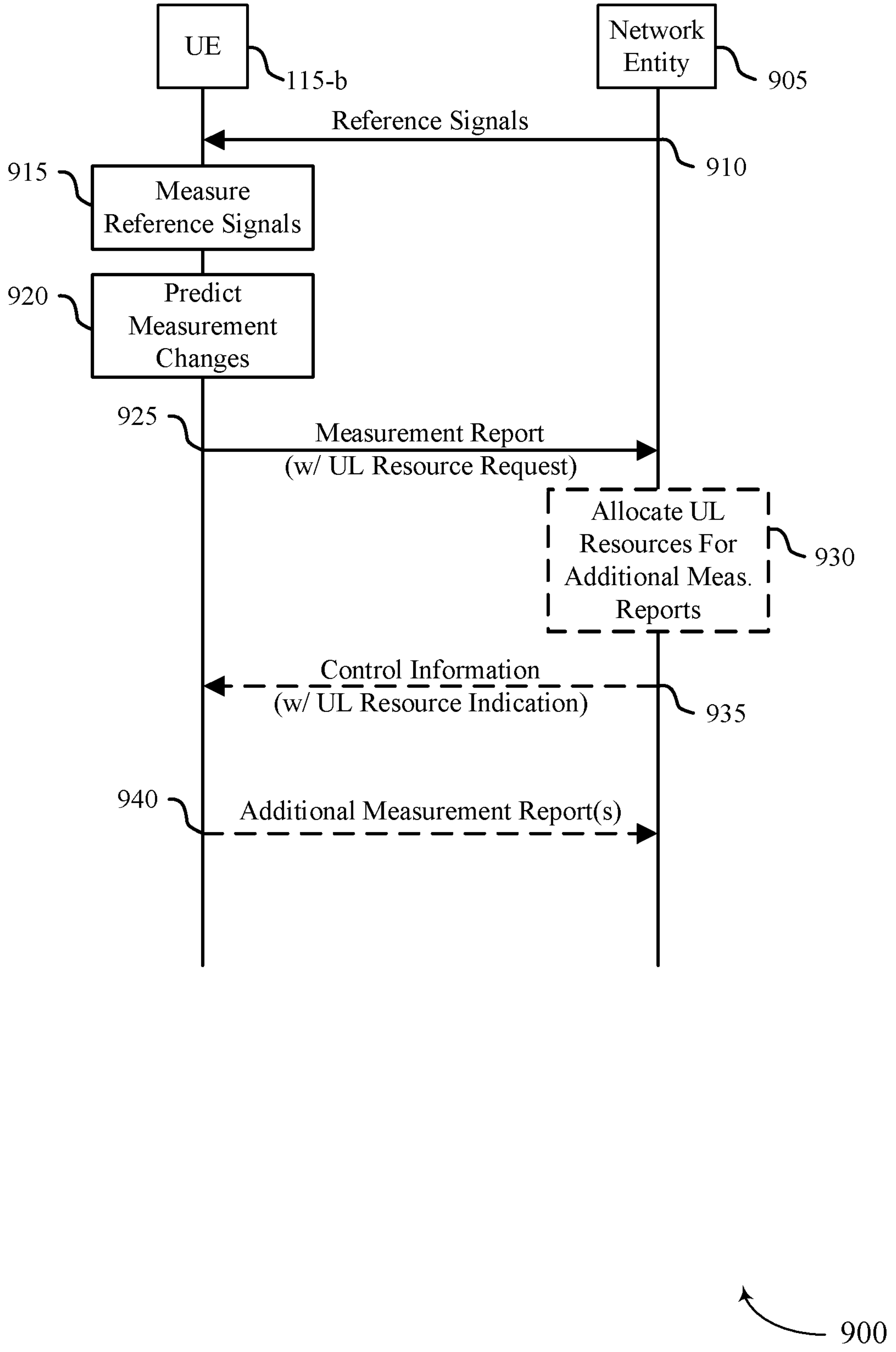
FIG. 9 shows an example of a process flow that supports measurement report resource management in wireless communications.

FIG. 9 illustrates an example of a process flow 900 that supports measurement report resource management in wireless communications. The process flow 900 may implement or be implemented to realize aspects of the wireless communications system 100, the network architecture 200, the signaling diagram 300, the actual and predictive measurement timing 500, the measurement reports and additional uplink resources 600 and 650, the measurement report with uplink resource request indication 700, or the uplink resource request field indications 800 and 850. For example, the process flow 900 illustrates communication between a UE 115-*b* and a network entity 905, each of which may be examples of UEs 115 and network entities as illustrated by and described with reference to FIGS. 1-8.

In the following description of the process flow 900, the operations may be performed (such as reported or provided) in a different order than the order shown, or the operations performed by the example devices may be performed in different orders or at different times. Some operations also may be left out of the process flow 900, or other operations may be added to the process flow 900. Further, although some operations or signaling may be shown to occur at different times for discussion purposes, these operations may actually occur at the same time.

At 910, the network entity 905 may transmit one or more reference signals that may be received at other devices within a coverage area of the network entity 905. For example, the reference signals may include one or more CSI-RSs that may be transmitted on different beams. In other examples, the reference signals may be transmitted via one or more SSBs, such as DMRSs transmitted in PBCH transmissions of one or more SSBs. In further examples, one or different reference signals may be transmitted by the network entity 905 and used for measurements at one or more receiving devices.

At 915, the UE 115-*b* may measure the reference signals transmitted by the network entity 905. The UE 115-*b* may measure, for example, one or more channel parameters such as RSRP or SINR. In some implementations, the measurements at the UE 115-*b* may be performed according to a measurement configuration, as discussed herein.

At 920, the UE 115-*b* may predict measurement changes associated with the measured reference signals. In some implementations, the UE 115-*b* may implement a predictive algorithm to estimate expected changes in measurements for one or more future time periods. For example, an AI or ML algorithm may predict measurement changes based on one or more recent measurements and historical measurement changes observed for different beams for various UE 115-*b* parameters such as, for example, one or more of a rate of change in measured parameters, UE 115-*b* movement, a rate of change of UE 115-*b* movement, UE 115-*b* location information, or relative signal strengths of different received reference signals, among others.

At 925, the UE 115-*b* may transmit, and the network entity 905 may receive, a measurement report that indicates the measured parameters of the UE 115-*b* and also includes an uplink resource request field. In some implementations, the UE 115-*b* may determine or otherwise ascertain, obtain, or select, based on the predicted measurement changes, whether one or more additional measurement reports should be transmitted. For example, if the predicted measurement changes indicate that a beam with a highest RSRP reported in the measurement report will have a lower RSRP at a future time period, and a different beam is predicted to have a higher RSRP at the future time period, the UE 115-*b* may request additional uplink resources for the future time period. In some implementations, the uplink resource request field may have multiple bit points, with one bit point mapped to indicate no additional uplink resources are requested and one or more remaining bit points mapped to indicate additional uplink resources are requested and, optionally, a type of uplink resource requested.

At 930, in the event that the measurement report includes a request for additional uplink resources, the network entity 905 may allocate uplink resources for one or more additional measurement reports. In some implementations, the uplink resources may be allocated for one or more future time periods associated with the request for additional uplink resources. At 935, the network entity 905 may provide control information to the UE 115-*b* that indicates the allocation of additional uplink resources. For example, the network entity 905 may provide DCI that indicates the additional uplink resources have been allocated. At 940, the UE 115-*b* may transmit, and the network entity 905 may receive, the one or more additional measurement reports. In some implementations, the one or more additional measurement reports may include predicted channel measurements, such as RSRPs or SINRs that are predicted at a predictive measurement architecture such as described with reference to FIG. 4. Additionally, or alternatively, the one or more additional measurement reports may include measured channel parameters from one or more reference signals transmitted by the network entity 905 that are associated with one or more corresponding future time periods of the one or more additional measurement reports.

Figure 10:
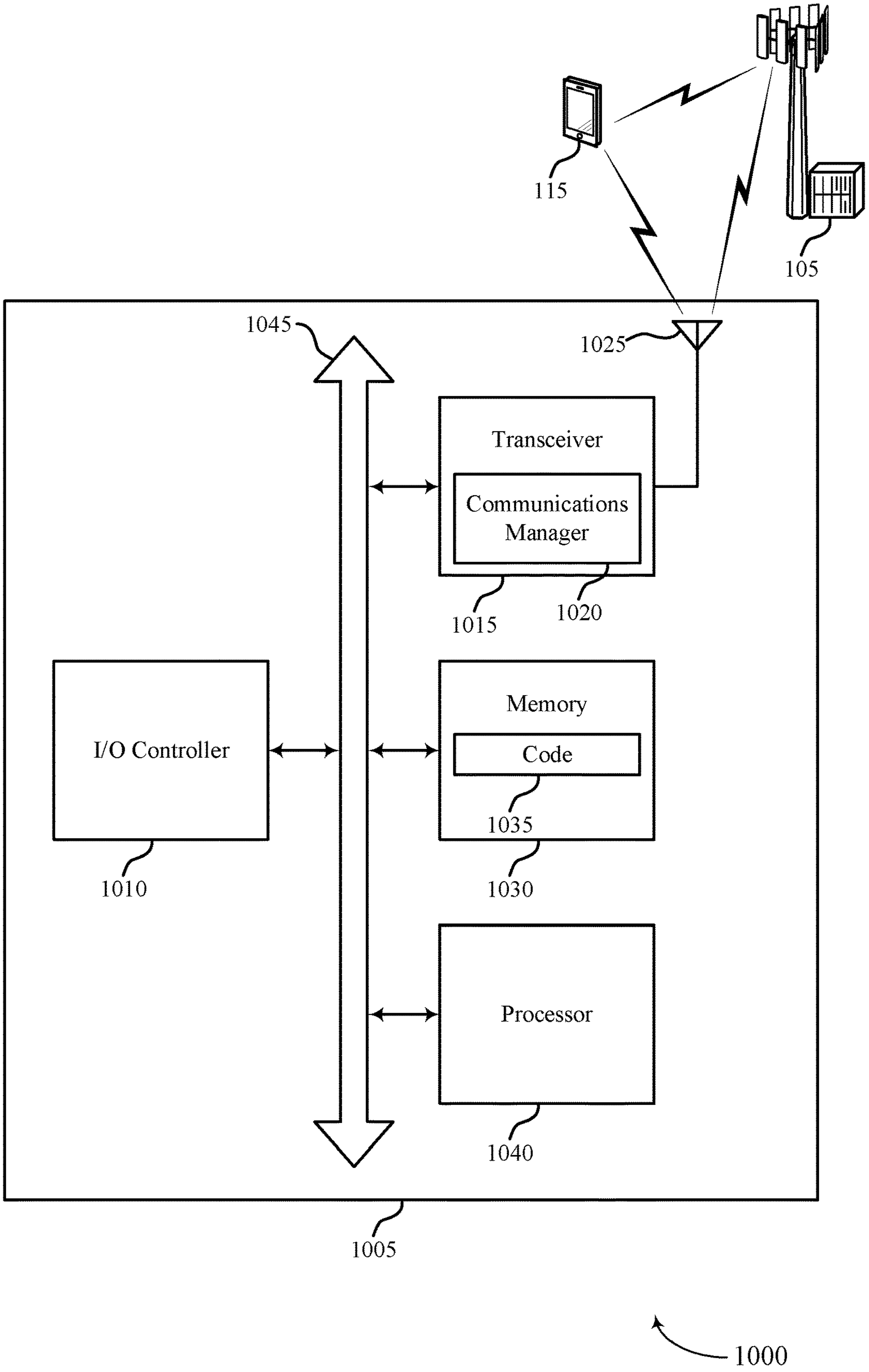
FIG. 10 shows a diagram of an example system including a device that supports measurement report resource management in wireless communications.

FIG. 10 shows a diagram of an example system 1000 including a device 1005 that supports measurement report resource management in wireless communications. The device 1005 may communicate (such as wirelessly) with one or more network entities, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (such as operatively, communicatively, functionally, electronically, electrically) via one or more buses (such as a bus 1045).

The I/O controller 1010 may manage input and output signals for the device 1005. The I/O controller 1010 also may manage peripherals not integrated into the device 1005. In some implementations, the I/O controller 1010 may represent a physical connection or port to an external peripheral. In some implementations, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some implementations, the I/O controller 1010 may be implemented as part of a processor or processing system, such as the processor 1040. In some implementations, a user may interact with the device 1005 via the I/O controller 1010 or via hardware components controlled by the I/O controller 1010.

In some implementations, the device 1005 may include a single antenna 1025. However, in some other implementations, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 also may include a modem to modulate the packets, to provide the modulated packets to one or more antennas 1025 for transmission, and to demodulate packets received from the one or more antennas 1025. In some implementations, the transceiver 1015 may include one or more interfaces, such as one or more interfaces coupled with the one or more antennas 1025 that are configured to support various receiving or obtaining operations, or one or more interfaces coupled with the one or more antennas 1025 that are configured to support various transmitting or outputting operations, or a combination thereof. In some implementations, the transceiver 1015 may include or be configured for coupling with one or more processors or memory components that are operable to perform or support operations based on received or obtained information or signals, or to generate information or other signals for transmission or other outputting, or any combination thereof. In some implementations, the transceiver 1015, or the transceiver 1015 and the one or more antennas 1025, or the transceiver 1015 and the one or more antennas 1025 and one or more processors or memory components (such as the processor 1040, or the memory 1030, or both), may be included in a chip or chip assembly that is installed in the device 1005.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some implementations, the code 1035 may not be directly executable by the processor 1040 but may cause a computer (such as when compiled and executed) to perform functions described herein. In some implementations, the memory 1030 may contain, among other things, a basic I/O system (BIOS) which may control basic hardware or software operation such as the interaction with peripheral components or devices.

The processor 1040 may be any one or more suitable processors capable of executing scripts or instructions of one or more software programs stored in the device 1005 (such as within the memory 1030). In some implementations, the processor 1040 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1040, or the transceiver 1015, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1005 may transmit information output from the chip or modem. In some implementations, the second interface may refer to an interface between the processing system of the chip or modem and a receiver, such that the device 1005 may obtain information or signal inputs, and the information may be passed to the processing system. A person having ordinary skill in the art will readily recognize that the first interface also may obtain information or signal inputs, and the second interface also may output information or signal outputs.

The communications manager 1020 may support wireless communication at a UE. For example, the communications manager 1020 may be configured as or otherwise support a means for transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and the second measurement report provides one or more of a predicted measurement or an actual measurement associated with the second channel measurement resource set. The communications manager 1020 may be configured as or otherwise support a means for receiving an indication that a second uplink resource is allocated for the second measurement report. The communications manager 1020 may be configured as or otherwise support a means for transmitting the second measurement report via the second uplink resource.

In some implementations, the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

In some implementations, the communications manager 1020 may be configured as or otherwise support a means for measuring a first set of reference signals associated with the first channel measurement resource set to obtain one or more measurements for the first measurement report, and predicting one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

In some implementations, the indication that the one or more additional uplink resources are requested is provided in an uplink resource request field that is transmitted with the first measurement report. In some implementations, a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

In some implementations, the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances.

In some implementations, a second bit value of the one or more remaining bit values indicates that a second measurement resource of the first channel measurement resource set is predicted to have a higher signal strength for one or more future time instances than a signal strength of a first measurement resource of the first channel measurement resource set.

In some implementations, the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

In some implementations, the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

In some implementations, the one or more remaining bit values are mapped to corresponding measurement report configurations according to one or more of an active measurement report configuration associated with the first channel measurement resource set, a time difference between transmission of the first measurement report and the second measurement report, or any combinations thereof.

In some implementations, the one or more additional uplink resources are requested for reporting one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

In some implementations, the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

In some implementations, the communications manager 1020 may be configured as or otherwise support a means for computing a difference between a first channel parameter reported in the first measurement report and one or more channel parameters to be reported in the second measurement report, and transmitting the second measurement report that indicates, for each of the one or more channel parameters in the second measurement report, the corresponding difference from the first channel parameter reported in the first measurement report.

In some implementations, the first channel parameter reported in the first measurement report is a highest reported signal strength of the first measurement report, or is identified with a measurement resource identification.

In some implementations, the second measurement report includes one or more parameters for a candidate cell for a handover procedure, one or more RI parameters associated with the second channel measurement resource set, one or more CQI parameters associated with the second channel measurement resource set, or any combinations thereof.

In some implementations, the communications manager 1020 may be configured to perform various operations (such as receiving, monitoring, transmitting) using or otherwise in cooperation with the transceiver 1015, the one or more antennas 1025, or any combination thereof. Although the communications manager 1020 is illustrated as a separate component, in some implementations, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of measurement report resource management in wireless communications as described herein, or the processor 1040 and the memory 1030 may be otherwise configured to perform or support such operations.

Figure 11:
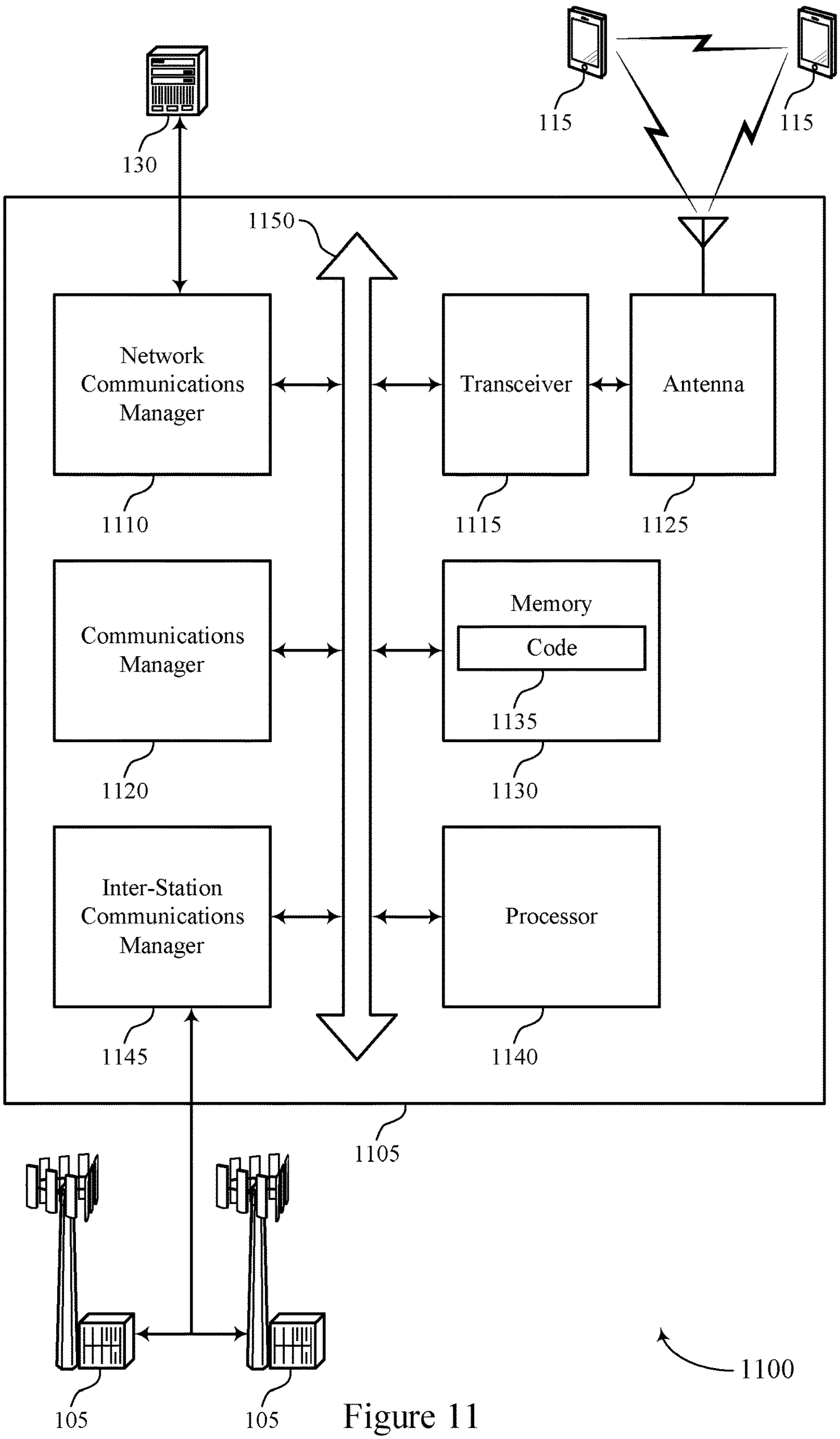
FIG. 11 shows another diagram of an example system including a device that supports measurement report resource management in wireless communications.

FIG. 11 shows another diagram of an example system 1100 including a device 1105 that supports measurement report resource management in wireless communications. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (such as operatively, communicatively, functionally, electronically, electrically) via one or more buses (such as a bus 1150).

The network communications manager 1110 may manage communications with a core network 130 (such as via one or more wired backhaul links). For example, the network communications manager 1110 may manage the transfer of data communications for client devices, such as one or more UEs 115.

In some implementations, the device 1105 may include a single antenna 1125. However, in some other implementations the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 also may include a modem to modulate the packets, to provide the modulated packets to one or more antennas 1125 for transmission, and to demodulate packets received from the one or more antennas 1125.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some implementations, the code 1135 may not be directly executable by the processor 1140 but may cause a computer (such as when compiled and executed) to perform functions described herein. In some implementations, the memory 1130 may contain, among other things, a BIOS which may control basic hardware or software operation such as the interaction with peripheral components or devices.

The processor 1140 may include an intelligent hardware device (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 1140 may be configured to operate a memory array using a memory controller. In some other implementations, a memory controller may be integrated into the processor 1140. The processor 1140 may be configured to execute computer-readable instructions stored in a memory (such as the memory 1130) to cause the device 1105 to perform various functions (such as functions or tasks supporting measurement report resource management in wireless communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other network entities, such as BSs 105, and may include a controller or scheduler for controlling communications with UEs 115 in cooperation with other network entities. For example, the inter-station communications manager 1145 may coordinate scheduling for transmissions to UEs 115 for various interference mitigation techniques such as beamforming or joint transmission. In some implementations, the inter-station communications manager 1145 may provide an X2 interface within an LTE/LTE-A wireless communications network technology to provide communication between network entities.

The communications manager 1120 may support wireless communication at a network entity. For example, the communications manager 1120 may be configured as or otherwise support a means for receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration. The communications manager 1120 may be configured as or otherwise support a means for transmitting an indication to the UE that a second uplink resource is allocated for the second measurement report. The communications manager 1120 may be configured as or otherwise support a means for receiving the second measurement report via the second uplink resource, where the second measurement report provides one or more of a predicted measurement or an actual measurement associated with the second channel measurement resource set.

In some implementations, the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

In some implementations, the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

In some implementations, the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

In some implementations, the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances, and a second bit value of the one or more remaining bit values indicates that a second measurement resource of the first channel measurement resource set is predicted to have a higher signal strength for one or more future time instances than the signal strength of the first measurement resource of the first channel measurement resource set, and where the first measurement resource has a higher signal strength than the second measurement resource in the first measurement report.

In some implementations, the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

In some implementations, the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

In some implementations, the one or more additional uplink resources are requested for reporting one or more of predicted RSRPs of one or more reference signals associated with the second measurement resource set in a CSI report for one or more future time instances, or one or more measured RSRPs of one or more reference signals associated with the second measurement resource set in a CSI report for one or more future time instances.

In some implementations, the second measurement report is a differential measurement report that indicates a difference between a first channel parameter reported in the first measurement report and one or more channel parameters reported in the second measurement report.

In some implementations, the first channel parameter reported in the first measurement report is a highest reported signal strength of the first measurement report, or is identified with a measurement resource identification.

In some implementations, the communications manager 1120 may be configured to perform various operations (such as receiving, monitoring, transmitting) using or otherwise in cooperation with the transceiver 1115, the one or more antennas 1125, or any combination thereof. Although the communications manager 1120 is illustrated as a separate component, in some implementations, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of measurement report resource management in wireless communications as described herein, or the processor 1140 and the memory 1130 may be otherwise configured to perform or support such operations.

Figure 12:
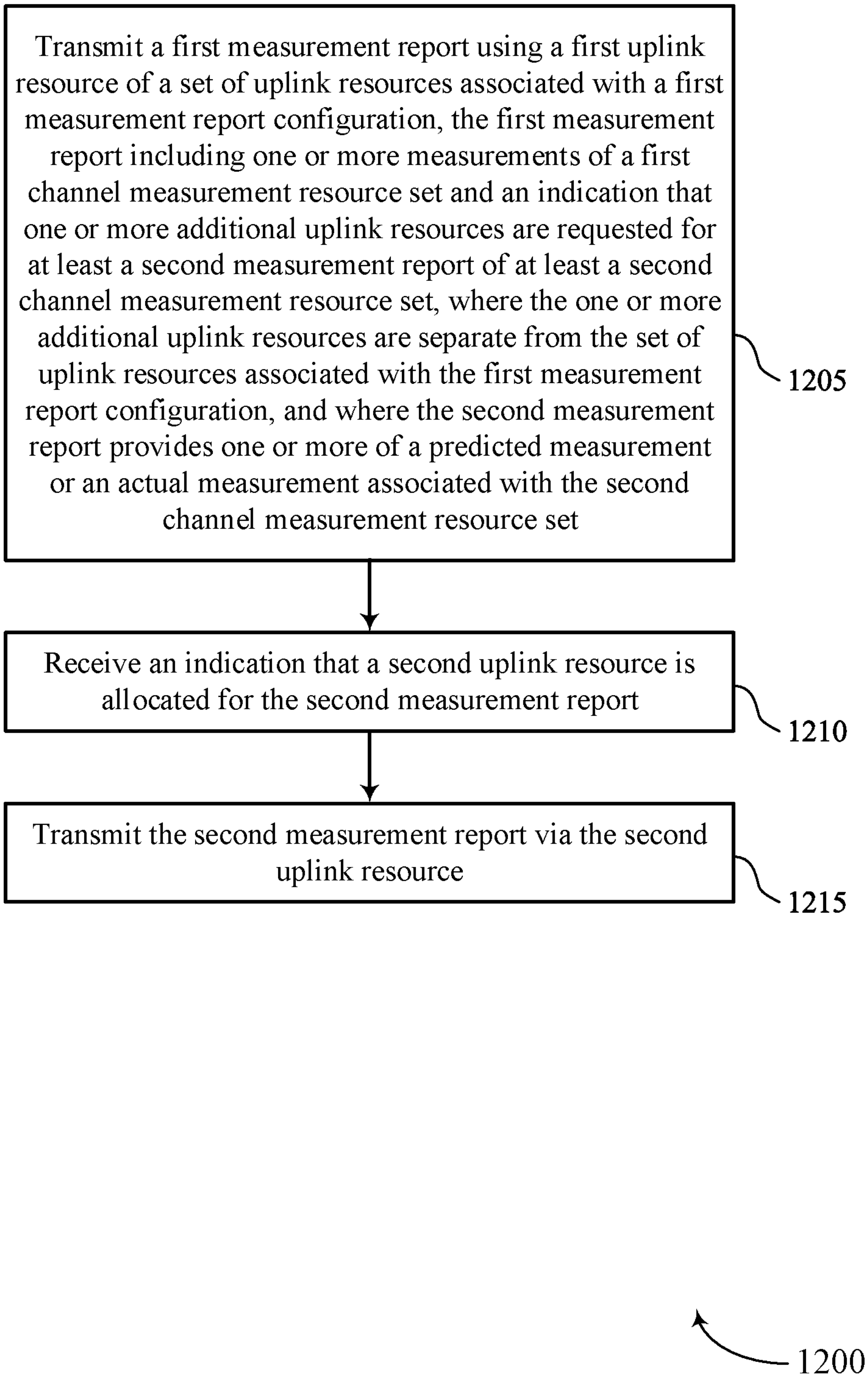
FIGS. 12 and 13 show flowcharts illustrating example methods that support measurement report resource management in wireless communications.

FIG. 12 shows a flowchart illustrating an example method 1200 that supports measurement report resource management in wireless communications. The operations of the method 1200 may be implemented by a UE or its components as described herein. For example, the operations of the method 1200 may be performed by a UE 115 as described with reference to FIGS. 1-10. In some implementations, a UE may execute a set of instructions to control the functional elements of the UE to perform the described functions. Additionally, or alternatively, the UE may perform aspects of the described functions using special-purpose hardware.

At 1205, the method may include transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set. The operations of 1205 may be performed in accordance with examples as disclosed herein. In some implementations, aspects of the operations of 1205 may be performed by a communications manager 1020 as described with reference to FIG. 10.

At 1210, the method may include receiving an indication that a second uplink resource is allocated for the second measurement report. The operations of 1210 may be performed in accordance with examples as disclosed herein. In some implementations, aspects of the operations of 1210 may be performed by a communications manager 1020 as described with reference to FIG. 10.

At 1215, the method may include transmitting the second measurement report via the second uplink resource. The operations of 1215 may be performed in accordance with examples as disclosed herein. In some implementations, aspects of the operations of 1215 may be performed by a communications manager 1020 as described with reference to FIG. 10.

Figure 13:
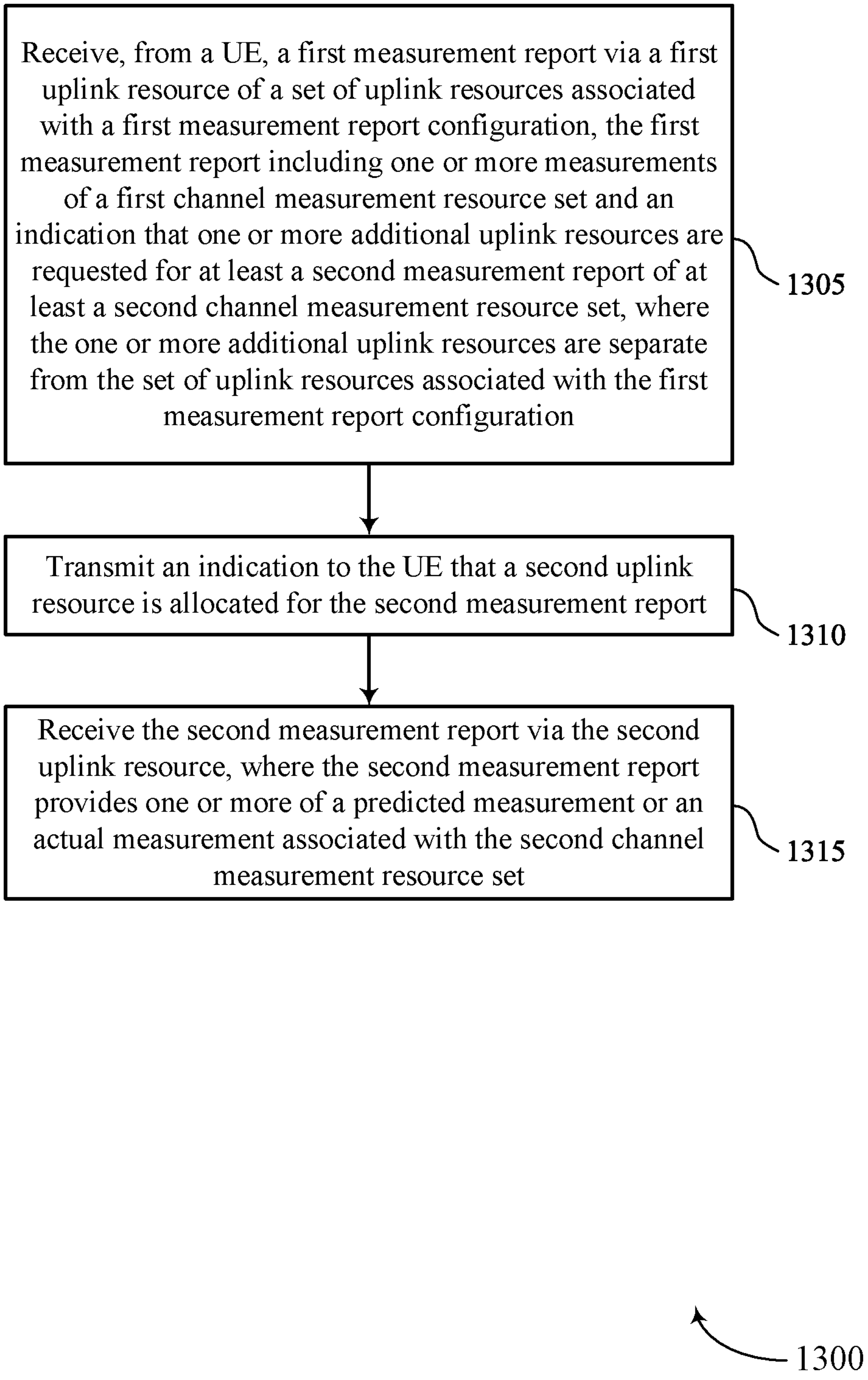

FIG. 13 shows a flowchart illustrating an example method 1300 that supports measurement report resource management in wireless communications. The operations of the method 1300 may be implemented by a network entity as described herein. For example, the operations of the method 1300 may be performed by a network entity as described with reference to FIGS. 1-9 and 11. In some implementations, a network entity may execute a set of instructions to control the functional elements of the network entity to perform the described functions. Additionally, or alternatively, the network entity may perform aspects of the described functions using special-purpose hardware.

At 1305, the method may include receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration. The operations of 1305 may be performed in accordance with examples as disclosed herein. In some implementations, aspects of the operations of 1305 may be performed by a communications manager 1120 as described with reference to FIG. 11.

At 1310, the method may include transmitting an indication to the UE that a second uplink resource is allocated for the second measurement report. The operations of 1310 may be performed in accordance with examples as disclosed herein. In some implementations, aspects of the operations of 1310 may be performed by a communications manager 1120 as described with reference to FIG. 11.

At 1315, the method may include receiving the second measurement report via the second uplink resource, where the second measurement report provides one or more of a predicted measurement or an actual measurement associated with the second channel measurement resource set. The operations of 1315 may be performed in accordance with examples as disclosed herein. In some implementations, aspects of the operations of 1315 may be performed by a communications manager 1120 as described with reference to FIG. 11.

The following provides an overview of some aspects of the present disclosure:

The following provides an overview of aspects of the present disclosure:

Aspect 1: A method for wireless communication at a UE, including: transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration, and where the second measurement report provides one or more of a predicted measurement or an actual measurement associated with the second channel measurement resource set; receiving an indication that a second uplink resource is allocated for the second measurement report; and transmitting the second measurement report via the second uplink resource.

Aspect 2: The method of aspect 1, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 3: The method of any of aspects 1 through 2, further including: measuring a first set of reference signals associated with the first channel measurement resource set to obtain one or more measurements for the first measurement report; and predicting one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

Aspect 4: The method of any of aspects 1 through 3, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 5: The method of aspect 4, where the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances.

Aspect 6: The method of any of aspects 4 through 5, where a second bit value of the one or more remaining bit values indicates that a second measurement resource of the first channel measurement resource set is predicted to have a higher signal strength for one or more future time instances than the signal strength of a first measurement resource of the first channel measurement resource set.

Aspect 7: The method of any of aspects 4 through 6, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 8: The method of any of aspects 4 through 7, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 9: The method of any of aspects 4 through 8, where the one or more remaining bit values are mapped to corresponding measurement report configurations according to one or more of an active measurement report configuration associated with the first channel measurement resource set, a time difference between transmission of the first measurement report and the second measurement report, or any combinations thereof.

Aspect 10: The method of any of aspects 1 through 9, where the one or more additional uplink resources are requested for reporting one or more of one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 11: The method of aspect 10, where the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

Aspect 12: The method of any of aspects 1 through 11, where the transmitting the second measurement report includes: computing a difference between a first channel parameter reported in the first measurement report and one or more channel parameters to be reported in the second measurement report; and transmitting the second measurement report that indicates, for each of the one or more channel parameters in the second measurement report, the corresponding difference from the first channel parameter reported in the first measurement report.

Aspect 13: The method of aspect 12, where the first channel parameter reported in the first measurement report is a highest reported signal strength of the first measurement report, or is identified with a measurement resource identification.

Aspect 14: The method of any of aspects 1 through 13, where the second measurement report includes one or more parameters for a candidate cell for a handover procedure, one or more RI parameters associated with the second channel measurement resource set, one or more CQI parameters associated with the second channel measurement resource set, or any combinations thereof.

Aspect 15: A method for wireless communication at a network entity, including: receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; transmitting an indication to the UE that a second uplink resource is allocated for the second measurement report; and receiving the second measurement report via the second uplink resource, where the second measurement report provides one or more of a predicted measurement or an actual measurement associated with the second channel measurement resource set.

Aspect 16: The method of aspect 15, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 17: The method of any of aspects 15 through 16, where the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

Aspect 18: The method of any of aspects 15 through 17, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 19: The method of aspect 18, where the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances, and a second bit value of the one or more remaining bit values indicates that a second measurement resource of the first channel measurement resource set is predicted to have a higher signal strength for one or more future time instances than the signal strength of the first measurement resource of the first channel measurement resource set, and where the first measurement resource has a higher signal strength than the second measurement resource in the first measurement report.

Aspect 20: The method of any of aspects 18 through 19, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 21: The method of any of aspects 18 through 20, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 22: The method of any of aspects 15 through 21, where the one or more additional uplink resources are requested for reporting one or more of one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 23: The method of any of aspects 15 through 22, where the second measurement report is a differential measurement report that indicates a difference between a first channel parameter reported in the first measurement report and one or more channel parameters reported in the second measurement report.

Aspect 24: The method of aspect 23, where the first channel parameter reported in the first measurement report is a highest reported signal strength of the first measurement report, or is identified with a measurement resource identification.

Aspect 25: An apparatus for wireless communication at a UE, including: an interface configured to: output a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; obtain an indication that a second uplink resource is allocated for the second measurement report; and output the second measurement report via the second uplink resource.

Aspect 26: The apparatus of aspect 25, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 27: The apparatus of any of aspects 25 through 26, where a processing system is configured to: measure a first set of reference signals associated with the first channel measurement resource set to obtain one or more measurements for the first measurement report; and predict one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

Aspect 28: The apparatus of any of aspects 25 through 27, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 29: The apparatus of aspect 28, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances.

Aspect 30: The apparatus of any of aspects 28 through 29, where a second bit value of the one or more remaining bit values indicates that a second measurement resource of the first channel measurement resource set is predicted to have a higher signal strength for one or more future time instances than a first measurement resource of the first channel measurement resource set.

Aspect 31: The apparatus of any of aspects 28 through 30, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 32: The apparatus of any of aspects 28 through 31, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 33: The apparatus of any of aspects 28 through 32, where the one or more remaining bit values are mapped to corresponding measurement report configurations according to one or more of an active measurement report configuration associated with the first channel measurement resource set, a time difference between transmission of the first measurement report and the second measurement report, or any combinations thereof.

Aspect 34: The apparatus of any of aspects 25 through 33, where the one or more additional uplink resources are requested for reporting one or more of: one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 35: The apparatus of aspect 34, where the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

Aspect 36: The apparatus of any of aspects 25 through 35, where a processing system is configured to compute a difference between a first channel parameter reported in the first measurement report and one or more channel parameters to be reported in the second measurement report; and output the second measurement report that indicates, for each of the one or more channel parameters in the second measurement report, the corresponding difference from the first channel parameter reported in the first measurement report.

Aspect 37: The apparatus of aspect 36, where the first channel parameter reported in the first measurement report is a highest reported signal strength of the first measurement report, or is identified with a measurement resource identification.

Aspect 38: The apparatus of any of aspects 25 through 37, where the second measurement report includes one or more parameters for a candidate cell for a handover procedure, one or more RI parameters associated with the second channel measurement resource set, one or more CQI parameters associated with the second channel measurement resource set, or any combinations thereof.

Aspect 39: An apparatus for wireless communication at a network entity, including: an interface configured to: obtain, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; output an indication to the UE that a second uplink resource is allocated for the second measurement report; and obtain the second measurement report via the second uplink resource.

Aspect 40: The apparatus of aspect 39, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 41: The apparatus of any of aspects 39 through 40, where the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

Aspect 42: The apparatus of any of aspects 39 through 41, where the indication that the one or more additional uplink resources are requested is provided in an uplink resource request field that is output with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 43: The apparatus of aspect 42, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances, and a second bit value of the one or more remaining bit values indicates that a second measurement resource of the first channel measurement resource set is predicted to have a higher signal strength for one or more future time instances than a first measurement resource of the first channel measurement resource set, and where the first measurement resource has a higher signal strength than the second measurement resource in the first measurement report.

Aspect 44: The apparatus of any of aspects 42 through 43, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 45: The apparatus of any of aspects 42 through 44, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 46: The apparatus of any of aspects 39 through 45, where one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 47: The apparatus of any of aspects 39 through 46, where the second measurement report is a differential measurement report that indicates a difference between a first channel parameter reported in the first measurement report and one or more channel parameters reported in the second measurement report.

Aspect 48: The apparatus of aspect 47, where the first channel parameter reported in the first measurement report is a highest reported signal strength of the first measurement report, or is identified with a measurement resource identification.

Aspect 49: An apparatus for wireless communication at a UE, including: a processor; memory coupled with the processor; and instructions stored in the memory and executable by the processor to cause the apparatus to: transmit a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; receive an indication that a second uplink resource is allocated for the second measurement report; and transmit the second measurement report via the second uplink resource.

Aspect 50: The apparatus of aspect 49, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 51: The apparatus of any of aspects 49 through 50, where the instructions are further executable by the processor to cause the apparatus to: measure a first set of reference signals associated with the first channel measurement resource set to obtain one or more measurements for the first measurement report; and predict one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

Aspect 52: The apparatus of any of aspects 49 through 51, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 53: The apparatus of aspect 52, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances.

Aspect 54: The apparatus of any of aspects 52 through 53, where a second bit value of the one or more remaining bit values indicates that a second measurement resource of the first channel measurement resource set is predicted to have a higher signal strength for one or more future time instances than a first measurement resource of the first channel measurement resource set.

Aspect 55: The apparatus of any of aspects 52 through 54, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 56: The apparatus of any of aspects 52 through 55, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 57: The apparatus of any of aspects 52 through 56, where the one or more remaining bit values are mapped to corresponding measurement report configurations according to one or more of an active measurement report configuration associated with the first channel measurement resource set, a time difference between transmission of the first measurement report and the second measurement report, or any combinations thereof.

Aspect 58: The apparatus of any of aspects 49 through 57, where one or more predicted reference signal received powers (RSRPs) of one or more reference signals associated with the second measurement resource set in a CSI report for one or more future time instances, or one or more measured RSRPs of one or more reference signals associated with the second measurement resource set in a CSI report for one or more future time instances.

Aspect 59: The apparatus of aspect 58, where the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

Aspect 60: The apparatus of any of aspects 49 through 59, where the instructions to transmit the second measurement report are executable by the processor to cause the apparatus to: compute a difference between a first channel parameter reported in the first measurement report and one or more channel parameters to be reported in the second measurement report; and transmit the second measurement report that indicates, for each of the one or more channel parameters in the second measurement report, the corresponding difference from the first channel parameter reported in the first measurement report.

Aspect 61: The apparatus of aspect 60, where the first channel parameter reported in the first measurement report is a highest reported signal strength of the first measurement report, or is identified with a measurement resource identification.

Aspect 62: The apparatus of any of aspects 49 through 61, where the second measurement report includes one or more parameters for a candidate cell for a handover procedure, one or more rank indictor (RI) parameters associated with the second channel measurement resource set, one or more channel quality indicator (CQI) parameters associated with the second channel measurement resource set, or any combinations thereof.

Aspect 63: An apparatus for wireless communication at a network entity, including: a processor; memory coupled with the processor; and instructions stored in the memory and executable by the processor to cause the apparatus to: receive, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; transmit an indication to the UE that a second uplink resource is allocated for the second measurement report; and receive the second measurement report via the second uplink resource.

Aspect 64: The apparatus of aspect 63, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 65: The apparatus of any of aspects 63 through 64, where the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

Aspect 66: The apparatus of any of aspects 63 through 65, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 67: The apparatus of aspect 66, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances, and a second bit value of the one or more remaining bit values indicates that a second measurement resource of the first channel measurement resource set is predicted to have a higher signal strength for one or more future time instances than a first measurement resource of the first channel measurement resource set, and where the first measurement resource has a higher signal strength than the second measurement resource in the first measurement report.

Aspect 68: The apparatus of any of aspects 66 through 67, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 69: The apparatus of any of aspects 66 through 68, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 70: The apparatus of any of aspects 63 through 69, where one or more predicted reference signal received powers (RSRPs) of one or more reference signals associated with the second measurement resource set in a CSI report for one or more future time instances, or one or more measured RSRPs of one or more reference signals associated with the second measurement resource set in a CSI report for one or more future time instances.

Aspect 71: The apparatus of any of aspects 63 through 70, where the second measurement report is a differential measurement report that indicates a difference between a first channel parameter reported in the first measurement report and one or more channel parameters reported in the second measurement report.

Aspect 72: The apparatus of aspect 71, where the first channel parameter reported in the first measurement report is a highest reported signal strength of the first measurement report, or is identified with a measurement resource identification.

Aspect 73: An apparatus for wireless communication at a UE, including: means for transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; means for receiving an indication that a second uplink resource is allocated for the second measurement report; and means for transmitting the second measurement report via the second uplink resource.

Aspect 74: The apparatus of aspect 73, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 75: The apparatus of any of aspects 73 through 74, further including: means for measuring a first set of reference signals associated with the first channel measurement resource set to obtain one or more measurements for the first measurement report; and means for predicting one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

Aspect 76: The apparatus of any of aspects 73 through 75, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 77: The apparatus of aspect 76, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances.

Aspect 78: The apparatus of any of aspects 76 through 77, where a second bit value of the one or more remaining bit values indicates that a second measurement resource of the first channel measurement resource set is predicted to have a higher signal strength for one or more future time instances than a first measurement resource of the first channel measurement resource set.

Aspect 79: The apparatus of any of aspects 76 through 78, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 80: The apparatus of any of aspects 76 through 79, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 81: The apparatus of any of aspects 76 through 80, where the one or more remaining bit values are mapped to corresponding measurement report configurations according to one or more of an active measurement report configuration associated with the first channel measurement resource set, a time difference between transmission of the first measurement report and the second measurement report, or any combinations thereof.

Aspect 82: The apparatus of any of aspects 73 through 81, where one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 83: The apparatus of aspect 82, where the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

Aspect 84: The apparatus of any of aspects 73 through 83, where the means for the transmitting the second measurement report include: means for computing a difference between a first channel parameter reported in the first measurement report and one or more channel parameters to be reported in the second measurement report; and means for transmitting the second measurement report that indicates, for each of the one or more channel parameters in the second measurement report, the corresponding difference from the first channel parameter reported in the first measurement report.

Aspect 85: The apparatus of aspect 84, where the first channel parameter reported in the first measurement report is a highest reported signal strength of the first measurement report, or is identified with a measurement resource identification.

Aspect 86: The apparatus of any of aspects 73 through 85, where the second measurement report includes one or more parameters for a candidate cell for a handover procedure, one or more RI parameters associated with the second channel measurement resource set, one or more CQI parameters associated with the second channel measurement resource set, or any combinations thereof.

Aspect 87: An apparatus for wireless communication at a network entity, including: means for receiving, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; means for transmitting an indication to the UE that a second uplink resource is allocated for the second measurement report; and means for receiving the second measurement report via the second uplink resource.

Aspect 88: The apparatus of aspect 87, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 89: The apparatus of any of aspects 87 through 88, where the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

Aspect 90: The apparatus of any of aspects 87 through 89, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 91: The apparatus of aspect 90, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances, and a second bit value of the one or more remaining bit values indicates that a second measurement resource of the first channel measurement resource set is predicted to have a higher signal strength for one or more future time instances than a first measurement resource of the first channel measurement resource set, and where the first measurement resource has a higher signal strength than the second measurement resource in the first measurement report.

Aspect 92: The apparatus of any of aspects 90 through 91, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 93: The apparatus of any of aspects 90 through 92, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 94: The apparatus of any of aspects 87 through 93, where one or more predicted RSRPs of one or more reference signals associated with the second measurement resource set in a CSI report for one or more future time instances, or one or more measured RSRPs of one or more reference signals associated with the second measurement resource set in a CSI report for one or more future time instances.

Aspect 95: The apparatus of any of aspects 87 through 94, where the second measurement report is a differential measurement report that indicates a difference between a first channel parameter reported in the first measurement report and one or more channel parameters reported in the second measurement report.

Aspect 96: The apparatus of aspect 95, where the first channel parameter reported in the first measurement report is a highest reported signal strength of the first measurement report, or is identified with a measurement resource identification.

Aspect 97: A non-transitory computer-readable medium storing code for wireless communication at a UE, the code including instructions executable by a processor to: transmit a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; receive an indication that a second uplink resource is allocated for the second measurement report; and transmit the second measurement report via the second uplink resource.

Aspect 98: The non-transitory computer-readable medium of aspect 97, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 99: The non-transitory computer-readable medium of any of aspects 97 through 98, where the instructions are further executable by the processor to: measure a first set of reference signals associated with the first channel measurement resource set to obtain one or more measurements for the first measurement report; and predict one or more measurement values for one or more future time instances for a second set of reference signals associated with the second channel measurement resource set to obtain one or more predicted measurements for the second measurement report, where one or more reference signals of the second set of reference signals correspond with one or more reference signals of the first set of reference signals, or are different reference signals than the first set of reference signals.

Aspect 100: The non-transitory computer-readable medium of any of aspects 97 through 99, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 101: The non-transitory computer-readable medium of aspect 100, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances.

Aspect 102: The non-transitory computer-readable medium of any of aspects 100 through 101, where a second bit value of the one or more remaining bit values indicates that a second measurement resource of the first channel measurement resource set is predicted to have a higher signal strength for one or more future time instances than a first measurement resource of the first channel measurement resource set.

Aspect 103: The non-transitory computer-readable medium of any of aspects 100 through 102, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 104: The non-transitory computer-readable medium of any of aspects 100 through 103, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 105: The non-transitory computer-readable medium of any of aspects 100 through 104, where the one or more remaining bit values are mapped to corresponding measurement report configurations according to one or more of an active measurement report configuration associated with the first channel measurement resource set, a time difference between transmission of the first measurement report and the second measurement report, or any combinations thereof.

Aspect 106: The non-transitory computer-readable medium of any of aspects 97 through 105, where one or more predicted reference signal received powers (RSRPs) of one or more reference signals associated with the second measurement resource set in a CSI report for one or more future time instances, or one or more measured RSRPs of one or more reference signals associated with the second measurement resource set in a CSI report for one or more future time instances.

Aspect 107: The non-transitory computer-readable medium of aspect 106, where the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

Aspect 108: The non-transitory computer-readable medium of any of aspects 97 through 107, where the instructions to transmit the second measurement report are executable by the processor to: compute a difference between a first channel parameter reported in the first measurement report and one or more channel parameters to be reported in the second measurement report; and transmit the second measurement report that indicates, for each of the one or more channel parameters in the second measurement report, the corresponding difference from the first channel parameter reported in the first measurement report.

Aspect 109: The non-transitory computer-readable medium of aspect 108, where the first channel parameter reported in the first measurement report is a highest reported signal strength of the first measurement report, or is identified with a measurement resource identification.

Aspect 110: The non-transitory computer-readable medium of any of aspects 97 through 109, where the second measurement report includes one or more parameters for a candidate cell for a handover procedure, one or more RI parameters associated with the second channel measurement resource set, one or more CQI parameters associated with the second channel measurement resource set, or any combinations thereof.

Aspect 111: A non-transitory computer-readable medium storing code for wireless communication at a network entity, the code including instructions executable by a processor to: receive, from a UE, a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, where the one or more additional uplink resources are separate from the set of uplink resources associated with the first measurement report configuration; transmit an indication to the UE that a second uplink resource is allocated for the second measurement report; and receive the second measurement report via the second uplink resource.

Aspect 112: The non-transitory computer-readable medium of aspect 111, where the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

Aspect 113: The non-transitory computer-readable medium of any of aspects 111 through 112, where the first measurement report includes measurements of a first set of reference signals associated with the first channel measurement resource set, and the second measurement report includes one or more predicted measurement values for one or more future time instances for a second set of reference signals associated with the second channel measurement resource set, where one or more reference signals of the second set of reference signals correspond with one or more reference signals of the first set of reference signals, or are different reference signals than the first set of reference signals.

Aspect 114: The non-transitory computer-readable medium of any of aspects 111 through 113, where the indication that the one or more additional uplink resources are requested is provided in an uplink resource request field that is transmitted with the first measurement report, and where a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

Aspect 115: The non-transitory computer-readable medium of aspect 114, where the first bit value indicates that a first measurement resource of the first channel measurement resource set with a highest reported signal strength among two or more signal strengths of two or more measurement resources in the first measurement report is predicted to maintain the highest reported signal strength among the two or more measurement resources for one or more future time instances, and a second bit value of the one or more remaining bit values indicates that a second measurement resource of the first channel measurement resource set is predicted to have a higher signal strength for one or more future time instances than a first measurement resource of the first channel measurement resource set, and where the first measurement resource has a higher signal strength than the second measurement resource in the first measurement report.

Aspect 116: The non-transitory computer-readable medium of any of aspects 114 through 115, where the one or more additional uplink resources are requested for reporting of one or more predicted measurements of the second channel measurement resource set for one or more future time instances subsequent to a first time instance associated with the one or more measurements of the first channel measurement resource set, and where the one or more future time instances are predefined time instances or provided in configuration information to the UE.

Aspect 117: The non-transitory computer-readable medium of any of aspects 114 through 116, where the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

Aspect 118: The non-transitory computer-readable medium of any of aspects 111 through 117, where one or more predicted reference signal received powers (RSRPs) of one or more reference signals associated with the second measurement resource set in a CSI report for one or more future time instances, or one or more measured RSRPs of one or more reference signals associated with the second measurement resource set in a CSI report for one or more future time instances.

Aspect 119: The non-transitory computer-readable medium of any of aspects 111 through 118, where the second measurement report is a differential measurement report that indicates a difference between a first channel parameter reported in the first measurement report and one or more channel parameters reported in the second measurement report.

Aspect 120: The non-transitory computer-readable medium of aspect 119, where the first channel parameter reported in the first measurement report is a highest reported signal strength of the first measurement report, or is identified with a measurement resource identification.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:

an interface configured to:

output a first measurement report for transmission using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, wherein the one or more additional uplink resources are separate from the set of uplink resources associated with the first measurement report configuration, and wherein the second measurement report provides one or more of a predicted measurement or an actual measurement associated with the second channel measurement resource set;

obtain an indication that a second uplink resource is allocated for the second measurement report; and output the second measurement report for transmission via the second uplink resource.

2. The apparatus of claim 1, wherein the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

3. The apparatus of claim 1, wherein a processing system is configured to:

measure a first set of reference signals associated with the first channel measurement resource set to obtain one or more measurements for the first measurement report; and predict one or more measurement values for one or more future time instances for a second set of reference signals associated with the second channel measurement resource set to obtain one or more predicted measurements for the second measurement report, wherein one or more reference signals of the second set of reference signals correspond with one or more reference signals of the first set of reference signals, or are different reference signals than the first set of reference signals.

4. The apparatus of claim 1, wherein:

the indication that the one or more additional uplink resources are requested is provided in an uplink resource request field that is output for transmission with the first measurement report, and wherein a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

5. The apparatus of claim 4, wherein the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances.

6. The apparatus of claim 4, wherein a second bit value of the one or more remaining bit values indicates that a second measurement resource of the first channel measurement resource set is predicted to have a higher signal strength for one or more future time instances than the signal strength of a first measurement resource of the first channel measurement resource set.

7. The apparatus of claim 4, wherein the one or more additional uplink resources are requested for reporting of one or more predicted measurements of the second channel measurement resource set for one or more future time instances subsequent to a first time instance associated with the one or more measurements of the first channel measurement resource set, and wherein the one or more future time instances are predefined time instances or provided in configuration information to the UE.

8. The apparatus of claim 4, wherein the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

9. The apparatus of claim 4, wherein the one or more remaining bit values are mapped to corresponding measurement report configurations according to one or more of an active measurement report configuration associated with the first channel measurement resource set, a time difference between transmission of the first measurement report and the second measurement report, or any combinations thereof.

10. The apparatus of claim 1, wherein the one or more additional uplink resources are requested for reporting one or more of:

one or more predicted reference signal received powers (RSRPs) of one or more reference signals associated with the second measurement resource set in a channel state information (CSI) report for one or more future time instances, or one or more measured RSRPs of one or more reference signals associated with the second measurement resource set in a CSI report for one or more future time instances.

11. The apparatus of claim 10, wherein the one or more future time instances correspond to one or more slots linked with the indication that one or more additional sets of uplink resources are requested, one or more slots associated with a configured offset value from a slot in which the first measurement report is transmitted, or one or more slots associated with an offset value provided with the indication that one or more additional sets of uplink resources are requested, or any combinations thereof.

12. The apparatus of claim 1, further comprising:

a processing system configured to compute a difference between a first channel parameter reported in the first measurement report and one or more channel parameters to be reported in the second measurement report;

wherein the interface is further configured to output the second measurement report that indicates, for each of the one or more channel parameters in the second measurement report, the corresponding difference from the first channel parameter reported in the first measurement report.

13. The apparatus of claim 12, wherein the first channel parameter reported in the first measurement report is a highest reported signal strength of the first measurement report, or is identified with a measurement resource identification.

14. The apparatus of claim 1, wherein the second measurement report includes one or more parameters for a candidate cell for a handover procedure, one or more rank indictor (RI) parameters associated with the second channel measurement resource set, one or more channel quality indicator (CQI) parameters associated with the second channel measurement resource set, or any combinations thereof.

15. An apparatus for wireless communication, comprising:

an interface configured to:

obtain, from a user equipment (UE), a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, wherein the one or more additional uplink resources are separate from the set of uplink resources associated with the first measurement report configuration;

output for transmission to the UE an indication that a second uplink resource is allocated for the second measurement report; and obtain the second measurement report via the second uplink resource, wherein the second measurement report provides one or more of a predicted measurement or an actual measurement associated with the second channel measurement resource set.

16. The apparatus of claim 15, wherein the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

17. The apparatus of claim 15, wherein:

the first measurement report includes measurements of a first set of reference signals associated with the first channel measurement resource set, and the second measurement report includes one or more predicted measurement values for one or more future time instances for a second set of reference signals associated with the second channel measurement resource set, wherein one or more reference signals of the second set of reference signals correspond with one or more reference signals of the first set of reference signals, or are different reference signals than the first set of reference signals.

18. The apparatus of claim 15, wherein:

the indication that the one or more additional uplink resources are requested is provided in an uplink resource request field that is output with the first measurement report, and wherein a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

19. The apparatus of claim 18, wherein:

the first bit value indicates that a first measurement resource of the first channel measurement resource set with a highest reported signal strength among two or more signal strengths of two or more measurement resources in the first measurement report is predicted to maintain a higher reported signal strength than other measurement resources of the two or more measurement resources for one or more future time instances, and a second bit value of the one or more remaining bit values indicates that a second measurement resource of the first channel measurement resource set is predicted to have a higher signal strength for one or more future time instances than the signal strength of the first measurement resource of the first channel measurement resource set, and wherein the first measurement resource has a higher signal strength than the second measurement resource in the first measurement report.

20. The apparatus of claim 18, wherein the one or more additional uplink resources are requested for reporting of one or more predicted measurements of the second channel measurement resource set for one or more future time instances subsequent to a first time instance associated with the one or more measurements of the first channel measurement resource set, and wherein the one or more future time instances are predefined time instances or provided in configuration information to the UE.

21. The apparatus of claim 18, wherein the one or more remaining bit values are mapped to corresponding measurement report configurations in a one-to-one linking between a corresponding measurement report configuration and each remaining bit value, or in a one-to-one linking between the corresponding measurement report configuration, each remaining bit value, and a time difference between transmission of the first measurement report and the second measurement report.

22. The apparatus of claim 15, wherein the one or more additional uplink resources are requested for reporting one or more of:

one or more predicted reference signal received powers (RSRPs) of one or more reference signals associated with the second measurement resource set in a channel state information (CSI) report for one or more future time instances, or one or more measured RSRPs of one or more reference signals associated with the second measurement resource set in a CSI report for one or more future time instances.

23. The apparatus of claim 15, wherein the second measurement report is a differential measurement report that indicates a difference between a first channel parameter reported in the first measurement report and one or more channel parameters reported in the second measurement report.

24. The apparatus of claim 23, wherein the first channel parameter reported in the first measurement report is a highest reported signal strength of the first measurement report, or is identified with a measurement resource identification.

25. A method for wireless communication at a user equipment (UE), comprising:

transmitting a first measurement report using a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, wherein the one or more additional uplink resources are separate from the set of uplink resources associated with the first measurement report configuration, and wherein the second measurement report provides one or more of a predicted measurement or an actual measurement associated with the second channel measurement resource set;

receiving an indication that a second uplink resource is allocated for the second measurement report; and transmitting the second measurement report via the second uplink resource.

26. The method of claim 25, wherein the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

27. The method of claim 25, wherein:

the indication that the one or more additional uplink resources are requested is provided in an uplink resource request field that is transmitted with the first measurement report, and wherein a first bit value of one or more bits of the uplink resource request field is mapped to an indication that no additional uplink resources are requested, and one or more remaining bit values of the one or more bits of the uplink resource request field are mapped to indicate that one or more additional uplink resources are requested, a type of uplink resources that are requested, or any combinations thereof.

28. The method of claim 25, wherein the one or more additional uplink resources are requested for reporting one or more of:

one or more predicted reference signal received powers (RSRPs) of one or more reference signals associated with the second measurement resource set in a channel state information (CSI) report for one or more future time instances, or one or more measured RSRPs of one or more reference signals associated with the second measurement resource set in a CSI report for one or more future time instances.

29. A method for wireless communication at a network entity, comprising:

receiving, from a user equipment (UE), a first measurement report via a first uplink resource of a set of uplink resources associated with a first measurement report configuration, the first measurement report including one or more measurements of a first channel measurement resource set and an indication that one or more additional uplink resources are requested for at least a second measurement report of at least a second channel measurement resource set, wherein the one or more additional uplink resources are separate from the set of uplink resources associated with the first measurement report configuration;

transmitting an indication to the UE that a second uplink resource is allocated for the second measurement report; and receiving the second measurement report via the second uplink resource, wherein the second measurement report provides one or more of a predicted measurement or an actual measurement associated with the second channel measurement resource set.

30. The method of claim 29, wherein the indication that the one or more additional uplink resources are requested further indicates a type of uplink resource requested for at least the second measurement report, the type of uplink resource indicating an amount of uplink resources associated with information of the second measurement report, one or more parameters provided with the second measurement report, whether the requested uplink resources are for aperiodic or semi-persistent measurement reporting, or any combinations thereof.

* * * * *